Figure 1:
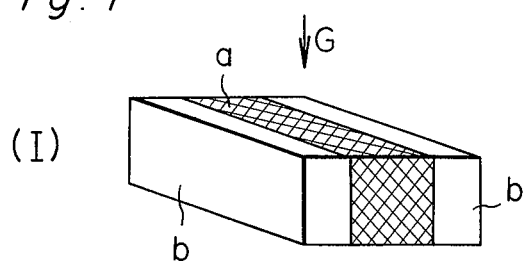
Figure 1:
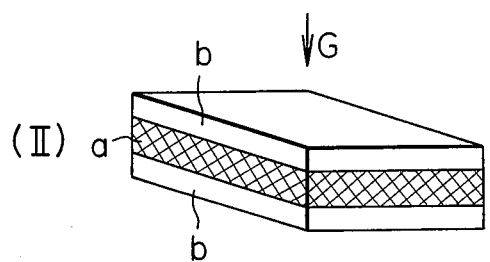

United States Patent [19]

Hirata et al.

[11] 3,932,692

[45] Jan. 13, 1976

[54] RESINIOUS LAMINATES HAVING IMPROVED GAS PERMEATION AND DELAMINATION RESISTANCE

[75] Inventors: Sadao Hirata; Syunsaku Hirata, both of Yokohama; Toru Suzuki, Yokosuka; Akira Kishimoto, Tokyo, all of Japan

[73] Assignee: Toyo Seikan Kaisha Limited, Tokyo, Japan

[22] Filed: Aug. 20, 1973

[21] Appl. No.: 389,791

[30] Foreign Application Priority Data
Aug. 20, 1972 Japan.............................. 47-83157
July 7, 1973 Japan.............................. 48-76138

[52] U.S. Cl................... 428/474; 428/35; 428/36; 428/423; 428/483; 428/519; 428/520; 428/522; 260/857 L; 260/899 B; 260/873; 264/176; 426/106
[51] Int. Cl.².................. B32B 27/08; C08G 41/04
[58] Field of Search.......... 161/252, 253, 254, 255, 161/256; 260/857 L, 899 B; 428/474

[56] References Cited
UNITED STATES PATENTS

| | | | |
|---|---|---|---|
| 3,075,857 | 1/1963 | Fior et al.................. | 260/857 L X |
| 3,419,654 | 12/1968 | Chiba....................... | 260/897 B |
| 3,639,502 | 2/1972 | Okazaki et al............. | 260/857 L X |
| 3,673,055 | 6/1972 | Sheld....................... | 161/252 X |
| 3,700,751 | 10/1972 | Mueller et al............. | 260/857 L |
| 3,767,523 | 10/1973 | Schwarz.................... | 161/254 |

FOREIGN PATENTS OR APPLICATIONS

| | | |
|---|---|---|
| 7,031,758 | 1970 | Japan |
| 1,254,354 | 11/1971 | United Kingdom |
| 1,950,479 | 5/1970 | Germany |

OTHER PUBLICATIONS
Soki, Chem. Ab. 75:6914w.

*Primary Examiner*—George F. Lesmes
*Assistant Examiner*—Patricia C. Ives
*Attorney, Agent, or Firm*—Diller, Brown, Ramik & Wight

[57] ABSTRACT

A resin laminate structure comprising a layer of a polyolefin and a layer of an ethylene-vinyl acetate copolymer saponified product having an ethylene content of 25 to 50 mole % and a degree of saponification of at least 96 %, wherein a thermoplastic polymer having a carbonyl group in the main chain or side chain thereof is incorporated in at least one of said two layers in an amount of 5 to 100 parts by weight per 100 parts by weight of said polyolefin or said ethylene-vinyl acetate copolymer saponified product.

17 Claims, 2 Drawing Figures

(I)

(II)

RESINIOUS LAMINATES HAVING IMPROVED GAS PERMEATION AND DELAMINATION RESISTANCE

This invention relates to a resin laminate structure comprising a polyolefin and an ethylene-vinyl acetate copolymer saponified product. More particularly, the invention relates to a resin laminate structure having in combination a high resistance to permeation of such ordinary gases as oxygen, carbon dioxide gas, steam, nitrogen and the like and a high resistance to delamination.

Polyolefins have heretofore been broadly used as packaging materials for foodstuffs and the like by reason of excellent mechanical strength and sanitation characteristics. However, polyolefins are fatally defective in that permeability of gases such as oxygen and carbon dioxide gas is very high, and polyolefins are still insufficient in that foodstuffs cannot be preserved for a long time with use of containers or the like formed of polyolefins.

As means for improving the gas permeation resistance in polyolefins, there have been proposed methods comprising copolymerizing ethylene with various vinyl monomers. For instance, U.S. Pat. No. 3,419,654 discloses the use of a saponified product of an ethylene-vinyl acetate copolymer. Although such saponified product is advantageous over polyolefins in the point that its oxygen permeability is much smaller than that of polyolefins, it is still defective in that its water vapor permeability is high because of its hydrophilic properties and that its mechanical strength, especially impact resistance, is considerably low.

It is considered that a packaging material having in combination characteristic properties of polyolefins and those of ethylene-vinyl acetate copolymer saponified products may be obtained by laminating a polyolefin and an ethylene-acetate copolymer saponified product. However, in such laminate structure, delamination readily occurs. The delamination resistance may be improved if a particular adhesive layer is interposed between the olefin layer and ethylene-vinyl acetate copolymer saponified product layer. In view of operational procedures, this in industrially disadvantageous in that a specific adhesive layer should be interposed to laminate a polyolefin layer and an ethylene-vinyl acetate copolymer saponified product layer and complicated steps are required for extrusion which requires a number of extruders.

We have found that in laminating a polyolefin layer and an ethylene-vinyl acetate saponified layer so that they are adjacent to each other, if a sepcific amount of a carbonyl group-containing thermoplastic polymer is incorporated into at least one of said two layers, both the layers can be tightly bonded with a good delamination resistance without the use of any particular adhesive and the resulting laminate structure substantially retains excellent properties of both the resin components, namely high moisture resistance, flexibility and sanitation characteristics inherent of the polyolefin and high oxygen-barrier property inherent of the saponified ethylene-vinyl acetate copolymer.

We have also found that when a melt of a blend of an ethylene-vinyl acetate copolymer saponified product with a specific amount of a carbonyl group-containing thermoplastic polymer and a melt of a polyolefin are under such specific co-extrusion conditions that in a multi-ply molding die the difference between the average flow rate of the ethylene-vinyl acetate copolymer saponified product and the average flow rate of the carbonyl group-containing thermoplastic polymer at the resin passage for said blend is at least 1 cm/sec, there can be obtained a molded laminate structure, the layer of the blend of which has such a laminar structure that the polymer composition is different in the thickness direction but substantially identical in the plane direction and each laminar layer is continuous with respect to the plane direction; such molded laminate structure comprises in a portion of the blend layer adjacent to the polyolefin layer a laminar layer containing the above carbonyl group-containing polymer predominantly, namely in an amount larger than the average carbonyl group-containing polymer content in the blend layer; and that by reason of such specific layer structure the above-mentioned molded laminate structure can possess an excellent, strong bonding between the polyolefin layer and the blend layer, which bonding is much superior to the bonding attained in a laminate structure comprising a mere layer of such blend with respect to not only the delamination resistance but also the impact resistance, water resistance, heat resistance and hot water resistance, and in this specific molded laminate structure the permeability of ordinary gases such as oxygen, steam and carbon dioxide gas can be much reduced.

It is a primary object of this invention to provide a novel laminate structure which exhibits an excellent permeation resistance similarly to oxygen, steam, carbon dioxide gas, etc. and which comprises a layer of a polyolefin and a layer of an ethylene-vinyl acetate copolymer saponified product, said two layers being tightly bonded to each other without use of any particular adhesive layer.

Another object of this invention is to provide a resin laminate structure which has in combination an excellent gas permeation resistance and an excellent delamination resistance and hence, is valuable as a container for liquid foodstuffs, medicines or cosmetics, such as bottle, tube and tank and as a packaging material such as film.

A further object of this invention is to provide a technique for preparing laminate structures, according to which a polyolefin and a saponified product of an ethylene-vinyl acetate copolymer are simultaneously extruded from melt extruders, and thus there can be obtained a strong bonding between a layer of the polyolefin and a layer of the saponified copolymer.

A still further object of this invention is to provide a novel molded laminate structure which is formed by co-extruding a melt of a polyolefin and a melt of a polymer blend of a saponified product of an ethylene-vinyl acetate copolymer and a carbonyl group-containing thermoplastic polymer and which has such a specific layer structure that a layer of said polymer blend has such a laminar structure that the polymer composition is different with respect to the thickness direction but substantially identical with respect to the plane direction and each laminate layer is continuous with respect to the plane direction and that in a portion of the polymer blend layer adjacent to the polyolefin layer there is formed a laminar layer containing the above carbonyl group-containing polymer in an amount exceeding the average content of said carbonyl group-containing polymer in the blend layer; and a process for the production of such novel laminate structures.

In accordance with one aspect of this invention, there is provided a resin laminate structure comprising a layer of a polyolefin and a layer of an ethylene-vinyl acetate copolymer saponified product having an ethylene content of 25 to 50 mole % and a degree of saponification of at least 96 %, wherein a thermoplastic polymer containing a carbonyl group at the main chain or side chain thereof is incorporated in at least one of said polyolefin layer and said ethylene-vinyl acetate copolymer saponified product in an amount of 5 to 100 parts by weight, especially 5.0 to 50 parts by weight, per 100 parts by weight of said polyolefin or said ethylene-vinyl acetate copolymer saponified product.

In accordance with another aspect of this invention, there is provided a resin laminate structure comprising a layer of a polyolefin and a layer of a blend including (A) an ethylene-vinyl acetate copolymer saponified product having an ethylene content of of 25 to 50 mole % and a degree of saponification of at least 96 % and (B) a thermoplastic polymer containing a carbonyl group at the main chain or side chain thereof, at an A : B weight ratio of from 95 : 5 to 50 : 50, said two layers being laminated so that they are adjacent to each other, wherein said blend layer has such a laminar structure that the polymer composition is different with respect to the thickness direction but is substantially identical with respect to the plane direction and when the blend layer is divided into three layers in the thickness direction, a divided layer adjacent to said polyolefin layer contain predominantly said carbonyl group-containing thermoplastic polymer, namely contains said ethylene-vinyl acetate copolymer saponified product in an amount expressed by the following formula:

$M_1 = m_1 X$ wherein X indicates an average content (% by weight) of said ethylene-vinyl acetate copolymer saponified product in said blend layer, $m_1$ is a number of from 0 to 9.95 and $M_1$ stands for a content of said ethylene-vinyl acetate copolymer saponified product in said divided layer adjacent to the polyolefin layer.

The laminate structure of this invention has various advantages in addition to a desired combination of a high permeation resistance to oxygen, steam, carbon dioxide gas, etc. and a high delamination resistance. By reason of excellent moisture resistance, sanitation characteristics and flexibility, polyolefins have heretofore been used broadly as containers for various liquid materials. However, disposal of used polyolefin containers involves a serious problem. More specifically, when used polyolefin containers are subjected as refuses to the incineration treatment, a large quantity of combustion heat is generated and refuse furnaces are readily damaged. In contrast, when a polyolefin is laminated with a saponified product of an ethylene-propylene copolymer, i.e., hydroxyl group-containing polymer, according to this invention, and a container formed from such laminate structure is burned in a refuse furnace the combustion heat generated at the incineration treatment will be much reduced as compared with the case of a polyolefin container, with the result that the damage of refuse furnaces can be greatly lowered.

This invention will now be described in detail.

Resin Components

The saponified product of an ethylene-vinyl acetate copolymer to be used in the laminate structure of this invention is obtained by saponifying an ethylene-vinyl acetate copolymer having an ethylene content of 25 to 50 mole % so that the degree of saponification reaches at least 96 %. In case the ethylene content exceeds 50 mole % in the saponified copolymer, the gas permeation resistance (gas-barrier property) to gases such as oxygen is lost, and the objects of this invention cannot be attained. Further, in a molded structure formed from such saponified copolymer, it is difficult to obtain a layer structure in which the polymer composition is different in the thickness direction, and use of such saponified copolymer is not suitable for attaining the above-mentioned specific objects of this invention. In case the ethylene content of the saponified copolymer is less than 25 mole %, the laminate structure exhibits a high hydrophilic property and its water vapor permeability becomes high with degradation of properties in the molten form, especially melt mold ability. Accordingly, use of such saponified copolymer is not suitable for attaining the objects of this invention.

In order for the laminate structure to have an improved gas permeation resistance, it is essential that the degree of saponification should be at least 96 %, in the ethylene-vinyl acetate copolymer saponified product.

A saponified product of an ethylene-vinyl acetate copolymer to be used in this invention preferably has an ethylene content of 25 to 45 mole % and a degree of saponification of at least 99 %.

The ethylene-vinyl acetate copolymer saponified product to be used in this invention is composed of polymerized ethylene units and vinyl alcohol units. Accordingly, in this invention saponified products of copolymers of ethylene with a monomer capable of forming a vinyl alcohol unit by saponification subsequent to polymerization, such as vinyl esters of lower fatty acids other than vinyl acetate, e.g., vinyl formate and vinyl propionate, can be similarly used as the saponified copolymer.

Further, the ethylene-vinyl acetate copolymer saponified product of this invention may be a terpolymer such as an ethylene-α-olefin-vinyl acetate copolymer saponified product containing a small amount, for instance, up to 5 mole % of other α-olefin such as propylene and butene-1.

The molecular weight of the ethylene-vinyl acetate copolymer saponified product to be used in this invention is not particularly critical, as long as it is within and ordinary range capable of forming films. In general, the viscosity of an ethylene-vinyl acetate copolymer saponified product is measured with use of a mixed solvent of 85 % by weight of phenol and 15 % by weight of weight of water. In this invention, it is preferred that the ethylene-vinyl acetate copolymer saponified product to be used has an intrinsic voscosity [η], measured at 30°C. in such mixed solvent, of from 0.07 to 0.17 l/g. In the case of a saponified copolymer having an intrinsic viscosity [η] of lower than 0.07 l/g, the mechanical strength of the final molded article is insufficient, and in the case of a saponified copolymer having an intrinsic viscosity [η] exceeding 0.17 l/g, the moldability of the resinous composition tends to be lowered.

In this invention, selection of a polyolefin among various thermoplastic resins and formation of a laminate structure by laminating the so specifically selected polyolefin with a saponified product of an ethylene-vinyl acetate copolymer are very important for attaining a desired combination of a high permeation resistance to not only oxygen and carbon dioxide but also water and a high delamination strength against all of ordinary gases such as oxygen, water vapor and carbon dioxide gas and excellent physical properties such as good stiffness, high impact resistance and high transparency.

Any of polyolefins which have heretofore been used for molding of films or containers and the like broadly in the art may be used as the polyolefin in this invention. As such polyolefin, there may be employed homopolymers and copolymers of olefins expressed by the following formula

wherein R is a hydrogen atom or an alkyl group having up to 4 carbon atoms.

In order to obtain a laminate structure having sufficient mechanical strength, it is essential that the olefin homopolymer or copolymer should be crystalline. As such crystalline polyolefin there may be mentioned, for instance, low density polyethylene, medium density polyethylene, high density polyethylene, isotactic polypropylene, crystalline ethylene-propylene copolymer, polybutene-1 and polypentene-1. Of course, in this invention the polyolefin to be used is not limited to olefin homopolymers and copolymers of two or more olefins, but copolymers comprising a small amount, for instance, up to 15 mole %, especially up to 5 mole %, of other ethylenically unsaturated comonomer within such a range as will not substantially damage the properties of the polyoelfin, may be used. As such comonomer component, there may be exemplified vinyl chloride, vinyl acetate, acrylic acid, esters thereof, methacrylic acid and esters thereof.

In general, the molecular weight of the polyolefin is not particularly critical in this invention, as far as it is within the film forming range. For instance, a polyolefin having an average molecular weight of from 5,000 to 400,000 [corresponding to a melt index MI (as measured according to ASTM 1238) from 0.05 to 5.0 g/10 min.] is used preferably in general.

Polyolefins to be preferably used in this invention are (I) a low density polyethylene having a density of from 0.917 to 0.929 g/cc, (II) a medium density polyethylene having a density of from 0.930 to 0.939 g/cc, (III) a high density polyethylene having a density of at least 0.940 g/cc, and (IV) an isotactic polypropylene.

In this invention, if improvement of such properties as transparency, flexibility, and impact resistance in the laminate structure is desired, a low density or medium density polyethylene is preferably employed as the polyolefin. If improvement of mechanical properties such as stiffness, tensile strength and tear strength is desired, a high density polyethylene or an isotactic polypropyle is preferably employed.

In the laminate structure of this invention comprising a layer of the above polyolefin and the above ethylene-vinyl acetate copolymer saponified product, it is improtant that a thermoplastic polymer containing a carbonyl group in the main chain or side chain thereof is incorporated in at least one of the polyolefin layer and the ethylene-vinyl acetate copolymer saponified product in an amount of 5.0 to 100 parts by weight, especially 5.0 to 50 parts by weight, per 100 parts by weight of the polyolefin or saponified copolymer.

As such carbonyl group-containing thermoplastic polymer, there may optionally be employed any of thermoplastic polymers containing in the main or side chain carbonyl groups from free carboxylic acids, carboxylic acid salts, carboxylic acid esters, carboxylic anhydrides, carboxylic acid amides, carbonic acid esters, urethane and urea. Examples of such polymer will now be described.

a. Homopolymers or copolymers of monomers expressed by the following formula (I), and copolymers of monomers expressed by the formula (I) with olefins and vinyl monomers.

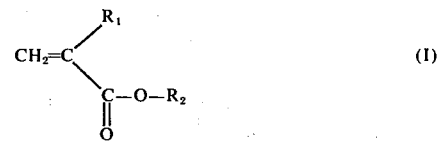

wherein $R_1$ is a hydrogen atom or a lower alkyl group, and $R_2$ is a hydrogen atom or an alkyl group having 1 to 12 carbon atoms.

Specific examples of the polymer of this type are polyacrylic acid esters, polymethacrylic acid esters, ethylene/acrylic acid ester copolymers, acrylic acid ester/acrylic acid copolymer, ethylene/acrylic acid ester/acrylic acid copolymers, ethylene/acrylic acid copolymers, styrene/methacrylic acid ester/acrylic acid copolymers, acrylic acid ester/vinyl chloride copolymers, methacrylic acid ester/vinyl chloride copolymers, styrene/methacrylic acid ester/butadiene copolymers, and methacrylic acid ester/acrylonitrile copolymers.

b. Homopolymers or copolymers of vinyl esters expressed by the following formula (II), and copolymers of monomers expressed by the formula (II) with olefins or other vinyl monomers:

wherein $R_3$ is a hydrogen atom or an alkyl or phenyl group.

Specific examples of the polymer of this type are polyvinyl acetate, polyvinyl propionate, ethylene/vinyl acetate copolymers, acrylic acid ester/vinyl acetate copolymers, and vinyl chloride/vinyl acetate copolymers.

c. Ionomers, that is, resins obtained by neutralizing copolymers of olefins with unsaturated carboxylic acids and optionally other vinyl monomers, with an alkali metal, an alkaline earth metal, zinc or an organic base.

Specific examples of the polymer of this type are Surlyns marketed by E. I. Du Pont de Nemours & Co., U. S. A.

d. Copolymers of maleic anhydride with olefins or other vinyl monomers.

Specific examples of the polymer of this type are maleic anhydride/vinyl ether copolymers, maleic anhydride/vinyl chloride copolymers, ethylene/maleic anhydride copolymers and maleic anhydride-modified polypropylenes.

e. Polyamides composed of the recurring units expressed by the formula

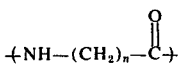

or

wherein *n* is a number of from 3 to 13 and *m* is a number of from 4 to 11.

Specific examples of the polymer of this type are poly-ω-aminocaroic acid, polyω-aminoheptanoic acid, poly-ω-aminocaprylic acid, poly-ω-aminopelagonic acid, poly-ω-aminodecanoic acid, poly-ω-aminoundecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide, and polytridecamethylene azelamide.

f. Polyesters composed of the recurring units expressed by the formula

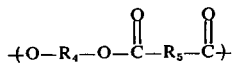

or

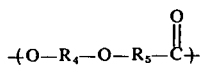

wherein $R_4$ is an alkylene group of 2 to 6 carbon atoms, and $R_5$ is an alkylene or arylene group of 2 to 24 carbon atoms.

Specific examples of the polymer of this type are polyethylene adipate, polyethylene sebacate, polyethylene terephthalate, polytetramethylene isophthalate, and polyethylene terephthalate/isophthalate.

g. Polyureas composed of the recurring units expressed by the formula

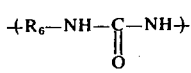

or

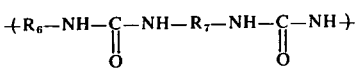

wherein $R_6$ and $r_7$ stand for an alkylene group of 1 to 13 carbon atoms.

Specific examples of the polymer of this type are polyhexamethyleneurea, polyheptamethyleneured, polyundecamethyleneurea and polynonamethyleneurea.

h. Polyurethanes or polyureaurethanes expressed by the formula

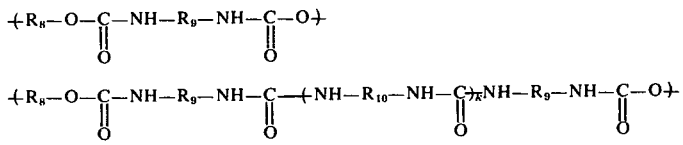

wherein $R_8$ is an alkylene group of 3 to 24 carbon atoms, or a polyether or polyester residue, $R_9$ is an alkylene or arylene group of 3 to 24 carbon atoms, $R_{10}$ is an alkylene or arylene group of 1 to 13 carbon atoms, and $k$ is 0 or 1.

Specific examples of the polymer of this type are polytetramethylenehexamethylene urethane, polyhexamethylenetetramethyleneurethane, and polyureaurethanes formed by chain-extending isocyanate-terminated polyesters or polyethers with a diamine or water.

i. Polycarbonates composed of the recurring units expressed by the formula

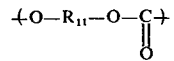

wherein $R_{11}$ is a hydrocarbon group of 8 to 15 carbon atoms.

Specific examples of the polymer of this group are poly-p-xyleneglycol biscarbonate, poly-dihydroxydiphenyl-methane carbonate, poly-dihydroxydiphenylethane carbonate, poly-dihydroxyphenyl-2,2-propane carbonate, and poly-dihydroxydiphenyl-1,1-ethane carbonate.

It is desired that the carbonyl group-containing polymer to be used in this invention contains carbonyl groups based on functional groups of free carboxylic acids, carboxylic acid salts, carboxylic acid esters, carboxylic acid amides, carboxylic anhydrides, carbonic acid esters, urethane and urea, in an amount of 120 to 1400 milliequivalents, especially 150 to 1200 milliequivalents, per 100 g of the polymer.

Such carbonyl group-containing polymers should be substantially linear and be molten at temperatures for melt molding the resulting resinous composition, for instance, at 170° to 300°C., preferable 180° to 250°C.

Carbonyl group-containing polymers which are readily available, can be easily blended and are very effective for improving the processability of the final resinous composition, that is, polymers which are especially suitable for attaining the objects of this invention, are polyvinyl acetate; copolymers of ethylene with a vinyl monomer containing a carboxylic acid salt group, such as vinyl acetate/ethylene copolymers, acrylic acid/ethylene copolymers, acrylic acid-grafted polyethylene, ethyl acrylate/ethylene copolymers and copolymers of ethylene with a carboxylic acid salt-containing vinyl monomer such as ionomers; maleic acid, modified polypropylene; and aliphatic polyamides such as poly-ω-aminocaproic acid, poly-ω-aminoundecanoic acid, poly-ω-aminododecanoic acid, polyhexamethylene adipamide and polyhexamethylene sebacamide.

It is most preferred that in case the polyolefin is a low density polyethylene or a medium density polyethylene, an ionomer of ethylene/acrylic acid ester copolymer is used and that in case the polyolefin is a high density polyethylene, an ionomer or acrylic acid-grafted polyethylene is employed. Further, in case the polyolefin is an isotactic polypropylene, use of a maleic acid-modified polyethylene is most preferred.

The molecular weight of the carbonyl group-containing polymer to be used is not particularly critical, as far as it is within such range that the polymer can be molded into a film or vessel.

So called compounding ingredients can be incorporated in resin layers constituting the laminate structure of this invention, but addition of such compounding ingredients is not absolutely necessary and objects of this invention can be fully attained without addition of such compounding ingredients.

In case the final laminate structure is used as a packaging material for food stuffs, it is preferred that such resin is directly subjected to the laminating operation without incorporation of so called compounding ingredients. However, if desired, it is possible to incorporate known additives such as ultraviolet absorbents, stabilizers, antioxidants, pigments, dyes and antistatic agents, in such amounts as not damaging the interlaminar bonding strength, for instance, up to 0.75 % by weight.

In the laminate structure of this invention, each layer may further comprise other polymers, for instance, other poly-α-olefins, olefin copolymers, vinyl polymers and diolefin polymers, in such amounts as will give no substantially bad influences to the gas permeation resistance, impact resistance and transparency of the resulting laminate structure for instance, in amounts of up to 10.0 parts by weight per 100 parts by weight of the composition.

In this invention, it is possible to incorporate an ethylene-vinyl acetate copolymer saponified product into the polyolefin layer of the laminate structure in such amount as will give no substantially bad influences to impact resistance and other properties, for instance, up to 10 by weight. It is also possible to incorporate a polyolefin into the ethylene-vinyl acetate copolymer saponified product layer in such amount as will give substantially no bad influences to gas permeation resistance and other properties, for instance up to 10 % by weight.

Laminate Structure

The laminate structure of this invention can take various forms of the layer disposition, as far as the condition that the polyolefin layer (PO) and the ethylene-vinyl acetate copolymer saponified product layer (saponified copolymer or EV) are laminated in the state adjacent to each other and the carbonyl group-containing thermoplastic polymer (C) is contained in at least one of the olefin layer and saponified copolymer layer. Specific examples of the layer disposition are as follows:

I. Asymmetric Two-Layer Laminate Structure:
Polyolefin layer/saponified copolymer layer:
a. PO + C/EV
b. PO/EV + C
c. PO + C/EV + C II. Symmetric Three-Layer Laminate Structure:
Polyolefin layer/saponified copolymer layer/polyolefin layer:
a. PO/EV + C/PO
b. PO + C/EV/PO + C
c. PO + C/EV + C/PO + C Saponified copolymer layer/polyolefin layer/saponified copolymer layer:
d. EV/PO + C/EV
e. EV + C/PO/EV + C
f. EV + C/PO + C/EV + C III. Asymmetric Three-Layer Laminate Structure:
First polyolefin layer (PO-1)/saponified copolymer layer/second polyolefin layer (PO-2):
a. PO-1/EV + C/PO-2
b. PO-1 + C/EV/PO-2 + C
c. PO-1 + C/EV + C/PO-2 + C Polyolefin layer/saponified copolymer layer/(polyolefin plus saponified copolymer) layer
d. PO/EV + C/PO + EV
e. PO + C/EV/PO + EV + C
f. PO + C/EV + C/PO + EV + C Of course, the laminate structure of this invention is not limited to the above-exemplified two-layer and three-layer structures, but it is possible to adapt such multi-layer structure as four-layer and five-layer structures. However, as detailed hereinbelow, if the specific laminar structure is formed in the blend layer, objects of this invention can be fully attained by a two-layer or three-layer structure.

In this invention, bonding excellent in delamination resistance can be obtained between the polyolefin layer and saponified copolymer layer if the carbonyl group-containing thermoplastic polymer is incorporated in at least one of the polyolefin layer and saponified copolymer layer adjacent to each other. As is exemplified above, it is possible to incorporate the carbonyl group-containing polymer into both of the polyolefin layer and saponified copolymer layer. The carbonyl group-containing polymer is incorporated in an amount of 5.0 to 100 parts by weight, preferably 5.0 to 50 parts by weight, especially preferably 5.0 to 30.0 parts by weight, per 100 parts by weight of the polyolefin or saponified copolymer. In case the content of the carbonyl group-containing polymer is smaller than the lower limit of the above range, it is difficult to form between the polyolefin and saponified copolymer a bonding having a sufficient delamination resistance to endure the falling impact or deformation stress when the laminate structure is molded into a container or the like and it is filled with a content. If the content of the carbonyl group-containing polymer exceeds the upper limit of the above range, an excellent steam-barrier property inherent of the polyolefin or an excellent oxygen-barrier property of the saponified copolymer is lost to some extent.

In general, this laminate structure has a thickness of at least 15 $\mu$, especially at least 70 $\mu$, and up to 6 mm, and it is useful as a molding material for preparing molded articles of a thin thickness having two-dimensional or three-dimensional surfaces, such as bottle, tube, tank, bag, other packaging containers, film, sheet, pipe and the like.

In case the laminate structure of this invention has a form of a container, it is preferred that the layer arrangement is decided in view of the kind of a material to be contained and the desired gas permeation resistance. For instance, if the material to be contained is an aqueous liquid, in view of the water resistance it is preferred that the inner layer of the container is a polyolefin layer. Further, when an oily material is contained in the container, in view of the oil resistance it is preferred that the inner layer of the container is a saponified copolymer layer. In each case, in view of the moisture resistance of the container per se it is preferred that the outermost layer of the vessel is a polyolefin layer.

In view of the foregoing, it is preferred that when the material to be contained is an ordinary aqueous material, a laminate structure selected from the above instances II-a, II-b, III-a and III-b is adopted and that when the material to be contained is an oily material, two-layer structures such as I-a and I-b or three-layer structures such as II-d, II-e and III-d are employed.

The thickness ratio of the polyolefin layer and saponified copolymer layer in the laminate structure of this invention varies greatly depending on the use of a final molded article and the layer arrangement, but it is generally preferred that the polyolefin layer has a thickness of at least 50 $\mu$ and the saponified copolymer layer has a thickness of at least 15 $\mu$.

Multi-Layer Molded Structure

In accordance with one preferred embodiment of this invention, there is provided a resin laminate structure comprising a layer of a polyolefin and a layer of a blend containing (A) an ethylene-vinyl acetate copolymer saponified product having an ethylene content of 25 to 50 mole % and a degree of saponification of at least 96 % and (B) a thermoplastic polymer containing a carbonyl group in the main chain or side chain thereof at an A : B mixing weight ratio ranging from 95 : 5 to 50 : 50, said two layers being laminated so that they are adjacent to each other, wherein the layer of said blend has such a laminar structure that the composition of the ethylene-vinyl acetate copolymer saponified product and the carbonyl group-containing thermoplastic polymer is different with respect to the thickness direction but is substantially identical in the plane direction.

The fact that in the blend layer of a preferred laminate structure of this invention the polymer composition is different in the thickness direction can be confirmed by sampling an optional layer from the blend layer by mechanical peeling means or the like and examining the infrared absorption spectrum of the sample.

For instance, the saponified ethylene-vinyl acetate copolymer exhibits an absorption at 3320 cm$^{-1}$ owing to the presence of the hydroxyl group, and therefore, the concentration of the saponified copolymer present in an optional layer of the molded structure can be determined by the following method:

i. One polyolefin (A) and a saponified product of an ethylene-vinyl acetate copolymer (B) whose ethylene content and degree of saponification were known were preliminarily blended (dry-blended) at a weight ratio of A : B ranging from 97.5 : 2.5 to 5 : 95, and then, the melt blending was conducted at 220°C. in a nitrogen atmosphere for 15 minutes with use of a Banbury mixer (the rotation rate of the rotor being 45 rpm). As a result of the microscopic observation, it was confirmed that in all of the mixtures obtained under such conditions the components A and B were mixed homogeneously.

ii. Each of the so formed mixtures was heated at 195°C. under a pressure of 10 Kg/cm$^2$ to 300 Kg/cm$^2$ for 20 minutes by employing a high pressure press and formed into a film having a thickness of 3 to 150$\mu$.

iii. The infrared absorption curve of each of the so formed films was obtained under conditions of a temperature of 20°C. and a relative humidity of 40 % by means of an infrared spectrophotometer.

iv. In each infrared absorption curve thus obtained, the point at 3100 cm$^{-1}$ was connected with the point at 3640 cm$^{-1}$ by a line. Then, the values of Io and I were read from the crossing point of said line and the line vertical to the wavelength axis at 3320 cm$^{-1}$ and from the crossing point of said vertical line and the absorption curve, respectively.

v. According to the following known equation $$\frac{\log (Io/I)}{\bar{\mu}} = KC$$

wherein $\mu$ is the average thickness ($\mu$) of the film used for the infrared absorption measurement, C designates the concentration (% by weight) of the saponified ethylenevinyl acetate copolymer, and K is a constant, the values of [log (Io/I)]$\bar{\mu}$ and C were plotted to obtain the calibration curve. Thus, the calibration curve expressed by the formula $$\frac{\log (Io/I)}{\bar{\mu}} = (0.85 \times 10^{-3})C$$

was obtained with respect to the mixture system of a low density polyethylene having a density of 0.920 g/cc (determined according to ASTM D-1505) and a saponified product of an ethylene-vinyl acetate copolymer having an ethylene content of 25.4 mole % and a degree of saponification of 99.2 %. In the same manner as described above, the calibration curve expressed by the formula $$\frac{\log (Io/I)}{\bar{\mu}} = (0.85 \times 10^{-3})C$$

was obtained with respect to the mixture system of a high density polyethylene having a density of 0.950 g/cc (determined according to ASTM D-1505) and said saponified copolymer.

Similarly, the calibration curve expressed by the formula $$\frac{\log (Io/I)}{\bar{\mu}} = (0.42 \times 10^{-3})C$$

was obtained with respect to the mixtue system of said high density polyethylene and a saponified ethylene-vinyl acetate copolymer having an ethylene content of 49.4 mole % and a degree of saponification of 96.3 %.

As the carbonyl group-containing thermoplastic polymer, there were chosen Surlyn A of the Na$^+$ type having a carboxylic acid concentration of 5 mole %, Surlyn A of The Zn$^{++}$ type having a carboxylic acid concentration of 10 mole %, an ethylene-vinyl acetate copolymer having a vinyl acetate concentration of 5 % by weight, an ethylene-vinyl acetate copolymer having a vinyl acetate concentration of 17 % by weight, an isotactic polypropylene, an ethylene-propylene copolymer, a high density polyethylene and a low density polyethylene, and these polymers were separately molded into films in the same manner as described in (ii) above.

Then, their infrared absorption spectrum curves were obtained in the same manner as descirbed in (iii)

above but in any of them there was not observed any absorption at 3320 cm⁻¹.

vi. A prescribed protion of the blend layer of the laminate structure was sampled by means of a knife. The sampled blend layer was divided in three layers extending in the direction vertical to the thickness direction and parallel to the plane direction by means of a microtome. The so obtained divided layers were molded into films in the same manner as (ii) above.

In Examples given below, these three layers are identified as follows:

Layer 1: divided layer adjacent to an outer layer
Layer 2: central divided layer
Layer 3: divided layer adjacent to an inner layer vii. The infrared absorption curve of each layer obtained in (vi) above was obtained under the same conditions with use of the same apparatus as in (iii) above.

viii. With respect to each of the so obtained infrared absorp-curves, the values $Io$ and $I$ were determined from the absorption at 3320 cm⁻¹ in the same manner as in (iv) above, and from these $Io$ and $I$ values and the average thickness ($\bar{\mu}$) of each film, the value of $[\log(Io/I)/\bar{\mu}]$ was calculated. The calculated value was put into the calibration curve equation of the corresponding mixture system described in (v) above, and the concentration of the saponified ethylene-vinyl acetate copolymer was calculated.

Further, the fact that the blend layer of a preferred laminate structure of this invention has such a laminar structure that the polymer composition is substantially identical with respect to the plane direction and each laminar layer is continuous with respect to the plane direction can be confirmed by, for instance, the measurement of the oxygen permeability.

1. With use of a multi-ply extruder such as used in Example 16 given hereinafter, the extrusion molding was carried out under the same conditions as adopted in Example 16 by employing the same outer and inner layer materials as used in this Example but changing the intermediate layer material as follows:

a. an ethylene-vinyl acetate copolymer saponified product having an ethylene content of 25.4 mole %, a degree of saponification of 99.2 %, an intrinsic viscosity of 0.08 l/g and a melt density of 1.07 g/cc as measured at 190°C.
 b. Surlyn A of the Na⁺ type (ionomer manufactured by Du Pont, U.S.A.) having a density of 0.942 g/cc, a melt density of 0.80 g/cc as measured at 190°C. and a carbonyl concentration of 160 milliequivalents per 100 g.

Thus, two of the bottles (the intermediate layer material being (a) or (b) above) were formed.

In these bottles, the configuration, the layer structure, the average thickness, the thickness ratio and the iner volume were the same as those of bottles obtained in Example 16.

2. With respect to each of the so obtained bottles, the oxygen permeability was determined according to the measurement method detailed below. As a result it was found that the oxygen permeability $Q_{EV}$ of the bottle (a) (intermediate layer material being the saponified copolymer) was 3.7 cc/m².day.atm and the oxygen permeability $Q_{su}$ of the bottle (b)(intermediate layer material being the Surlyn A) was 1160 cc/m².day.atm.

3. FIG. 1 is a model view illustrating a typical instance of the distribution state of each resin component in the blend layer of the laminate structure.

In FIG. 1 (I) and (II) indicate a two-component system of said saponified copolymer and Surlyn A such as obtained in Example 1. In (I), the saponified copolymer and Surlyn A are aligned in parallel to the thickness direction, and the polymer composition is identical with respect to the thickness direction and one plane direction (Y direction) but is different in another plane direction (X direction). In contrast, in (II) each of the above resins is aligned vertically to the thickness direction and the polymer composition is identical with respect to plane directions (X and Y directions) but is different in the thickness direction. Namely, in (II) of FIG. 1, a model of a so-called laminate is shown. In FIG. 1, each symbol has the following meaning:

a. : ethylene-vinyl acetate copolymer saponified product
 b. : Surlyn A (ionomer manufactured by Du Pont, U.S.A.)
 G. : Gas permeation direction The gas permeability of each of models (I) and (II) is expressed by the following formula:

(I) $Q = V_{EV} \times Q_{EV} + V_{su} \times Q_{su}$ (1)
(II) $1/Q = V_{EV}/Q_{EV} + V_{su}/Q_{su}$ (2)

in which $V_{EV} + V_{su} = 1$.

In each of the above formulas (1) to (2) symbols have the following meanings:

Q : the gas permeability of each model blend layer
$Q_{EV}$ : the gas permeability of the saponfied copolymer
$Q_{su}$ : the gas permeability of the Surlyn A
$V_{EV}$ : the volume ratio of the saponified copolymer in the blend layer
$V_{su}$ : the volume ratio of the Surlyn A in the blend layer 4. The permeability of oxygen or the like is known with respect to each model shown in FIG. 1 if the thickness is constant, and such known value is shown below each model. In the case of the two-component blend same as shown in Example 16, the volume ratios of the saponified copolymer and Surlyn A ($V_{EV}$ and $V_{su}$) are calculated from the mixing ratio of both the resins shown in Example 16 and the densities of both the resins indicated in (1) above, and the oxygen permeability of each of model (I) and (II) is calculated from the oxygen permeability Q of each of bottles (a) and (b) mentioned in (2) above. As a result, it is found that in the case of model (I) the value Q of 649 cc/m².day.atm is obtained from the formula (1) and in the case of model (II) the value Q of 8.3 cc/m².day.atm is obtained from the formula (2).

5. As is seen from data shown in Table 18 of Example 16, the oxygen permeability of a bottle (bottle A) obtained by employing a metering screw of a low mixing effect as an intermediate layer extruder and conducting the extrusion under such conditions the difference of the average flow rate between the two resins is at least 1 cm/sec is 19.1 cc/m².day.atm. This value is much closer to the value of the so called laminate model (II)(8.3 cc/m².day.atm) than to the value of model (I)(649 cc/m².day.atm).

6. As is seen from results shown in (4) and (5) above, the blend layer of the laminate structure of this invention has such a laminar structure that the composition of the saponified copolymer and the Surlyn A is different with respect to the thickness direction but is identical with respect to the plane direction and a substantially continuous phase is formed with respect to the plane direction.

In a preferred embodiment of the laminate structure of this invention, the blend layer has such a laminar structure that when the blend layer is divided into three layers in the direction of thickness, namely a first surface layer, an intermediate layer and a second surface layer, the divided layer adjacent to the polyolefin layer (first surface layer and/or second surface layer) contains predominantly the carbonyl group-containing polymer, namely contains the ethylene-vinyl acetate copolymer saponified product in an amount expressed by the following formula $$M_1 = m_1 \times X \qquad (A)$$

in which $X$ is the average content (% by weight) of the ethylene-vinyl acetate copolymer saponified product in the blend layer, $m_1$ is a number of from 0 to 0.95, and $M_1$ is the content (% by weight) of the ethylene-vinyl acetate copolymer saponified product in the divided layer adjacent to the polyolefin layer.

This layer containing the carbonyl group-containing thermoplastic polymer predominantly (carbonyl group-predominant layer) is distributed in the blend layer so that the blend layer as a whole is bonded to the polyolefin layer through this carbonyl group-predominant layer. For instance, in case the laminate structure is of the above-mentioned asymmetric two-layer type I-b or I-c, symmetric three-layer type II-e or II-f, only the surface layer of the blend layer adjacent to the polyolefin layer can be such carbonyl group-predominant layer, or both the surface layers of the blend layer can be such carbonyl group-predomenant layers. Further, in case the laminate structure is of the above-mentioned symmetric three-layer type II-a or II-c or the above-mentioned asymmetric three-layer type III-a, III-c, III-d or III-f, the blend layer is so constructed that both the surface layers of the blend layer are carbonyl group-predominant layers.

According to this preferred embodiment of this invention, the carbonyl group-containing thermoplastic polymer is predominantly contained in the surface layer of the blend layer adjacent to the polyolefin layer and hence, the ethylene-vinyl acetate copolymer saponified product is predominantly contained in another layer, the intermediate divided layer or the other surface layer. Namely, the intermediate divided layer or the other surface divided layer contains the ethylene-vinyl acetate copolymer saponified product in an amount expressed by the following formula $$M_2 = m_2 \times X \qquad (B)$$

wherein $X$ is as defined above, $M_2$ is the content (% by weight) of the ethylene-vinyl acetate copolymer saponified product in said divided layer not adjacent to the polyolefin layer and $m_2$ is a number of from 1.2 to 4.

In the above preferred embodiment of the laminate structure of this invention, since the carbonyl group-containing thermoplastic polymer is predominantly contained in the surface divided layer of the blend layer, which is adjacent to the polyolefin layer and hence, the ethylene-vinyl acetate copolymer saponified product is predominantly contained in another divided layer of the blend layer, it is made possible to maintain the gas permeation resistance of the laminate structure at a very low level and heighten the interlaminar strength between the polyolefin layer and the blend layer to a level corresponding to the fracture strength of the resin material per se.

As is illustrated in Example 1 given hereinafter, in the laminate structure of this invention, since the blend layer has such specific laminar multi-layer structure, it exhibits a much higher interlaminar strength and a much lower oxygen permeability than a laminate structure in which the blend layer is homogeneous throughout its structure. In the case of the laminate structure in which the blend layer is homogeneous, if it is intended to maintain the interlaminar strength between the blend layer and polyolefin layer at a practically applicable level, it is necessary to incorporate the carbonyl group-containing polymer in a considerable amount, and in this case, such an undesired tendency that the oxygen permeability increases to some extent with increase of the amount of the carbonyl group-containing polymer incorporated. In contrast, when the above-mentioned laminar multi-layer structure is formed in the blend layer of the laminate structure, even if the amount incorporated of the carbonyl group-containing polymer, the interlaminar strength between the blend layer and polyolefin layer can be maintained at a high level. Further, even if the amount incorporated of the carbonyl group-containing polymer is large, the oxygen permeability can be maintained at a low level.

Furthermore, in the laminate structure of this preferred embodiment of this invention, since the blend layer is bonded tightly to the polyolefin directly without forming a particular adhesive layer, the lamination operation can be performed very easily.

Molding Process

The laminate structure of this invention can be prepared by melting separately the polyolefin and the ethylene-vinyl acetate copolymer saponified product and co-extruding the polyolefin melt and the saponified copolymer melt in the laminar form so that they are adjacent to each other. In this case, at an optional stage prior to the co-extrusion, the prescribed amount of the carbonyl group-containing thermoplastic polymer is incorporated in at least of the polyolefin and the saponified copolymer.

It is sufficient that the carbonyl group-containing polymer is merely blended with the polyolefin or the saponified copolymer, prior to the melt extrusion, at room temperature in the powdery or granular form by means of a dry blender or mixer. It is also possible to melt mix the carbonyl group-containing polymer with the polyolefin or saponified copolymer by means of a Bumbury mixer, a pelletizer or a heating roll. Two different melt extruders are employed to melt the polyolefin and the saponified copolymer separately, and the melts of both the polymers are joined at a die head and co-extruded therefrom.

Any molding conditions can be adopted in this invention, as far as a resin or resin composition can be molten and extruded uniformly. In general, it is preferred that the molding is conducted at a temperature of 170° to 250°C. and a pressure of 10 to 300 Kg/cm².

As the die head, there can be used, for instance, a T-die head (or slit die head) employed in an ordinary film-forming method, a ring die heat employed in an inflation film-forming method, a cross head employed in a blow molding method, and a spider head.

When the polyolefin melt and the saponified copolymer are co-extruded and laminated so that they are adjacent to each other, there is formed a polymer layer arrangement such as the above-mentioned types I-a to III-f. In this case, it is of course important that these die heads are so arranged that each of combined resin flows is passed through the die passage in the form of a laminar flow, namely substantial mingling of the resins is not caused to occur.

Operations for molding the laminate structure into bottles, tubes, bags, tanks, films sheets, pipes and the like are well known in the art except for the above points, and known molding techniques can be applied to the molding of the laminate structure of this invention into such molded articles.

Furthermore, instead of combining the flow of the polyolefin and the saponified copolymer layer flow in the die head and extruding them simultaneously, it is possible to extrude these resin flows separately in a parallel relationship (inclusive of the concentric relationship) and lap them at the extrusion point or at a point spaced from the extrusion point while the resin layers are still molten.

The laminate structure of this invention can be prepared by a so called extrusion coating method as well as the above-mentioned co-extrusion method. For instance, the polyolefin layer of the laminate structure is prepared in advance in the form of a film, and an ethylene-vinyl acetate copolymer saponified product is molten and extrusion-coated on one or both surfaces of the film of the polyolefin layer. Further, a saponified copolymer layer is prepared in advance in the form of a film, and a polyolefin layer is melt-extruded and coated on one or both the surfaces of this film.

The preferred laminate structure of this invention is prepared by a method comprising co-extruding (1) a polyolefin and (2) a blend of an ethylene-vinyl acetate copolymer and a carbonyl group-containing thermoplastic polymer under a pressure of at least 5 Kg/cm$^2$ for the polyolefin and a pressure of at least 3 Kg/cm$^2$ for the blend at a temperature of 170° to 300°C. through a multi-layer forming die under such conditions that the difference $|\bar{V}_1 - \bar{V}_2|$ between the average flow rate ($\bar{V}_1$) of the melt of said saponified copolymer and the average flow rate ($\bar{V}_2$) of said carbonyl group-containing polymer is at least 1 cm/sec at the resin passage for the blend, and combining the resin flows to effect the co-extrusion molding.

In the above-mentioned preferred method of this invention, if only the above conditions are satisfied, it is possible to form in the flow of the blend melt coming from the multi-layer forming die of the extruding machine a multi-layer laminar structure in which the surface portion to be located at the position adjacent to the polyolefin layer contains predominantly the carbonyl group-containing thermoplastic polymer.

In case the extrusion molding temperature is lower than 170°C., since the molding temperature approximates the melting point of the saponified ethylene-vinyl acetate copolymer, in the resulting molded product it is impossible to attain in the blend layer a laminar layer structure in which each laminar layer is continuous with respect to the plane direction. Further, in case the extrusion molding temperature is higher than 300°C., the molten resin flows are intermingled too intinately and it is difficult to obtain a molded product having the specific multi-layer structure specified in this invention, and degradation is caused by oxidation or thermal decomposition of the resins, especially the saponified ethylene-vinyl acetate copolymer.

At a blend-extruding pressure lower than 3 Kg/cm$^2$, it is generally difficult to attain the average flow rate difference of at least 1 cm/sec between the average flow rate ($\bar{V}_1$) of the saponified copolymer melt and the average flow rate ($\bar{V}_2$) of the carbonyl group-containing polymer melt at the resin passage for the blend in the die. In case the pressure for extrusion of the blend is higher than 3 Kg/cm$^2$ and the pressure for extrusion of the polyolefin or saponified copolymer is higher than 5 Kg/cm$^2$, the press molding effect is caused at the point of junction of two resin flows in the multi-ply molding die, and the interlaminar strength can be further heightened.

There is no upper limit of the pressure for extrusion of each layer. In other words, the extrusion of each layer is conducted under such pressure that no excessive load is imposed on the extruder, and the extrusion pressure is chosen appropriately depending on the capacity and dimension (such as the screw diameter) of the extruder and other factors. When either of the blend and the polyolefin is extruded under an excessively high pressure, the other resin is pressed by said excessively high extrusion pressure and it is likely prevented from flowing toward the end portion of the die. Accordingly, it is necessary to keep a good balance between the pressure for extrusion of the blend layer and the pressure for extrusion of the polyolefin or saponified copolymer layer.

In this embodiment for obtaining a molded article having a multi-layer laminar structure, it is important that the extrusion conditions are so selected that the value expressed by the following formula $$|\bar{V}_2 - \bar{V}_1| = \Delta \bar{v}_{1-2}$$

is at least 1 cm/sec, preferably 1 to 10 cm/sec. In the instant specification and claims, the average flow rate ($\bar{v}$) is defined to be the value expressed by the following formula $$\bar{v} = (Q/3.6d)/S$$

wherein $Q$ stands for the amount (Kg/hr) of the resin melt extruded from the die of the extruder at prescribed temperature and pressure, $d$ designates the density (g/cc) of the resin melt and $S$ represents the sectional area (cm$^2$) of the die passage.

The density of the resin melt can be determined by calculating the amount extruded $\eta$(cc) at prescribed pressure (e.g., 50 Kg/cm$^2$) and temperature by means of, for instance, a visometer of the constant pressure extrusion type according to the following equation.

$$\eta = HA - \pi r^2 l$$

wherein $H$ is the length (cm) of the lowering of the plunger, $A$ is the cross-sectional area (cm$^2$) of the barrel, $r$ is the orifince radius (cm), and $l$ is the orifice length (cm), measuring the weight $W$ (g) of $\eta$ cc of the extrudate, and conducting the calculation according to the following formula $$d = W/\eta \text{ (g/cc)}.$$

In this invention, conditions for adjusting the $\Delta \bar{v}_{1-2}$ value to at least 1 cm/sec are attained, for instance, by the following procedures:

1. With use of a melt extruder of the same structure and capacity, the degree of dependency of the average flow rate on temperature and pressure is determined with respect to each of the starting carbonyl group-containing polymer and saponified ethylene-vinyl acetate copolymer, respectively, and the temperature and pressure conditions are decided so that the difference ($\Delta \bar{v}_{1-2}$) between the average flow rate ($\bar{v}_1$) of the polyolefin melt and the average flow rate ($\bar{v}_2$) of the saponified copolymer melt will be at more than 1cm/sec.

2. The structure or dimension of the extruder is changed or modified so that under prescribed temperature and pressure conditions the value $\Delta \bar{v}_{1-2}$ will be at least 1 cm/sec. For instance, since the sectional area of a passage for the resin melt in the die of the extruder gives a great influence to the flow rate of the resin melt, the condition of the value $\Delta \bar{v}_{1-2}$ being at least 1 cm/sec is attainable by adjusting the radius of the above passage within a suitable range.

3. It is possible to satisfy the condition of the $\Delta \bar{v}_{1-2}$ value being at least 1 cm/sec by combining the above procedures (1) and (2) appropriately.

In conducting the molding method of this invention, if under such conditions as will give the $\Delta \bar{v}_{1-2}$ value of less than 1 cm/sec, it is difficult to obtain a laminate structure comprising a blend layer having the specific multi-layer laminar structure specified in this invention. On the other hand, when the $\Delta \bar{v}_{1-2}$ is too great, a good balance is not obtained between the flows of the molten carbonyl containing group and of the molten saponified copolymer and hence, the molding tends to be difficult in some cases. In view of the foregoing, it is desired to select such conditions as will give the $\Delta \bar{v}_{1-2}$ value ranging from 1 to 10 cm/sec.

As far as the above condition is satisfied, any of known melt extruders may be optionally used in this invention.

As such co-extruder, there can be mentioned, for instance, a combination of a plurality of melt-extruders for melting the blend and the polyolefin or saponified copolymer independently and a multi-ply molding die having a plurality of passages connected to extrusion zones of the above extruders, respectively (inclusive of a die head mounted on the end portion of the die to combine and extrude the resin melt flows). In this case, it is important that care should be taken so that the resin melt formed in the cylinder zone of the exuder is allowed to move through passages of the die and die head in the form of a laminar flow. In other words, it is important that substantial mingling of molten resin flows is not caused to occur. Accordingly, it is preferred to employ as the screw a full-flighted screw such as a metering screw, but in the case of an ordinary screw generally called a mixing screw, such as a screw of the dulmage type, if it has five or less threads in the mixing zone, it is possible to obtain a laminate structure having a blend layer having the specific multi-layer laminar structure specified in this invention by suitably choosing the extrusion conditions of such screw, for instance, the diameter of the screw or the sectional area of the die passage. In order to increase the effect of kneading or mixing resins, or to prevent incorporation of foreign substances into a molded article, such members as a breaker plate and a screen are mounted at the die portion of the extruder in some cases in the art of the extrusion molding. In this invention, however, provision of such members on the die portion is not preferred because it prevents the molten resins from flowing in the laminar form. But if desired, it is permissible to use a breaker plate having less than 300 holes, or less than 5 screens of 120 mesh, and in such case, if the provision place of such breaker plate or screens, the sectional area of the die passage or other extrusion condition is suitably adjusted, it is possible to obtain a laminate structure comprising a blend having the multilayer laminar structure specified in this invention. Furthermore, in case the $\Delta v_{1-2}$ value is within the above-mentioned range but relatively small, by employing an extruder having a die passage of a relatively great length, it is made possible to manifest the above-mentioned specific laminar structure more prominently in the blend layer of the laminate structure.

In order to impart pressure resistance and other properties to the laminate structure of this invention, it is possible to combine it with other film, sheet or folio according to a so called dry-laminate technique.

Uses

The molded laminate structure of this invention can be clearly distinguished from a blend of a polyolefin and an ethylene-vinyl acetate copolymer saponified product and a laminate structure of a polyolefin and an ethylene-vinyl acetate copolymer saponified product. In the structure formed by laminating a polyolefin with an ethylene-vinyl acetate copolymer saponified product, since there is not bondability between the two resins, it is necessary to employ a particular adhesive for bonding them. Although such laminate structure is excellent in the gas permeation resistance, it is inferior with respect to the interlaminar strength, heat resistance, water resistance, hot water resistance and impact strength and further, this laminate structure is defective in that the preparation steps are complicated. In a molded structure composed of a homogeneous blend of a polyolefin and an ethylene-vinyl acetate copolymer, each of the permeation resistance to oxygen and carbon dioxide gas and the steam permeation resistance is almost the arithmetic mean of the value of the polyolefin alone and that of the saponified copolymer alone.

In contrast, in the laminate structure of this invention, by a simple operation of incorporating a carbonyl group-containing polymer into at least one of an polyolefin layer or ethylene-vinyl acetate copolymer saponified product layer, it is made possible to form between both the resin layers a tight bonding excellent in the impact resistance and water resistance while substantially retaining a high steam permeation resistance of the polyolefin and a high oxygen permeation resistance of the saponified copolymer. Further, the laminate structure of this invention has a relatively high transparency and gives a good arrearance when molded into a container or vessel. Accordingly, the laminate structure of this invention has a high commercial value.

In the laminate structure having a blend layer of a multi-layer laminar structure, a blend layer containing an ethylene-vinyl acetate copolymer saponified product and a carbonyl group-containing polymer is laminated with a layer of a polyolefin, and said blend layer comprises, at a portion adjacent to the polyolefin layer, a layer in which the carbonyl group-containing polymer is predominantly contained, and at other portion, a layer in which the saponified copolymer is predominantly contained. By reason of the above specific structure, in the laminate structure of this invention, the interlaminar strength can be heightened to a level comparable to the fracture strength of the laminate material while retaining substantially an excellent steam permeation resistance of the polyolefin layer and an excellent oxygen permeation resistance. Moreover, the laminate structure of this invention is excellent in not only appearance characteristics such as surface smoothness and transparency but also mechanical properties such as impact resistance. By dint of such excellent properties, the laminate structure of this invention is very valuable for preserving without degradation liquid, pasty and gel-like foodstuffs such as condiments, e.g., soy, sauce, vinegar, unrefined soy or sake, dressing, mayonaise, edible oil, soy paste, lard, catchup, etc., alcoholic drinks e.g., sake, precooked rice products and noodles, and other foodstuffs, e.g., soy curd, jam, butter, margarine, etc. Further, the laminate structure of this invention is useful as a container for preserving liquid medicines, agricultural chemicals, cosmetics and detergents. It is also useful as a vessel for preserving aliphatic or aromatic organic solvents or higher fatty acids while prevention the volume decrease of the content.

Still in addition, when the laminate structure is subjected to the incineration treatment in the form of a used container or vessel, the amount of heat generated by combustion is much smaller than in the case of a used container or vessel of an ordinary polyolefin, and it does not yield a toxic gas during the incineration treatment. Accordingly, the laminate structure of this invention is valuable as a container or vessel causing no environmental pollution.

This invention will now be illustrated by reference to Examples.

In each Example the oxygen gas permeability $QO_2$, water loss $Lw$, falling strength $f_{10}$ and average interlaminar peel strength $Sp$ were determined according to the following methods.

1. Oxygen Gas Permeability, $QO_2$:

1-i. Bottles:

Nitrogen gas was introduced into an evacuated sample bottle to be tested, and an opening of the bottle was sealed with a rubber plug. Contacting surface portions of the opening and rubber plug were coated with an epoxy adhesive, and the bottle was kept for a prescribed period in a thermostatically controlled tank maintained at a temperature of 37°C. and a relative humidity of 15 %. Then, the concentration of oxygen, which had permeated into the bottle was determined by the gas chromatography and the oxygen gas permeability $QO_2$ was calculated according to the following equation. Each value given in Examples is a mean value obtained by conducting this test with respect to three samples.

$$QO_2 = \frac{m \times \frac{Ct}{100}}{t \times Op \times A} (cc/m^2 \cdot day \cdot atm)$$

in which $m$ is an amount (ml) of nitrogen gas filled in the bottle, $t$ is a period (day) during which the bottle was kept in the thermostat tank, $Ct$ is a concentration (% by volume) when $t$ days have passed, $A$ is an effective surface area ($m^2$) of the bottle, and $Op$ is a partial pressure (atm) of oxygen (= 0.209).

1-ii. Films or Sheets:

A gas permeation tester was used for the determination. A sample was fixed to two chambers, and one chamber was evacuated to a pressure below $10^{-2}$ mmHg (low pressure side). The atmosphere in the other chamber (high pressure side) was replaced by oxygen gas of 1 atmosphere. The pressure increase on the low pressure side was read by a recorder to know the change in the pressure with the lapse of time. Thus, the oxygen gas permeation $QO_2$ was determined. The measurement was conducted at a temperature of 37°C. and the relative humidity on the high pressure side was 15 % (75% in some cases). Each value is a mean value obtained from the results of the test made on three samples.

2. Water Loss, $Lw$:

2-i. Bottles:

A certain amount of distilled water was filled in a sample bottle, and an opening of the bottle was sealed with a hot melt adhesive coated on an aluminum foil. The bonded areas of the opening and aluminum foil were covered with an epoxy adhesive.

2-ii. Films or Sheets:

A sample was formed into a bag having a length of 170 mm and a width of 115 mm by means of a heat sealer, and about 200 g of distilled water was filled in the bag. Then, an opening of the bag was heat-sealed.

In each of 2-i and 2-ii, the sample was kept for 21 days in a thermostatically controlled tank maintained at a temperature of 50°C. and a relative humidity of 10 %. The weight of the sample was measured, and the water loss $Lw$ was calculated according to the following equation. Each value is a mean value obtained from the results of the test made on three samples.

$$Lw = 100 \times \frac{W_0 - W_{21}}{W_0} (\% \text{ by weight})$$

in which $W_0$ is the weight (g) of water at the start of the test, and $W_{21}$ is the weight (g) of water after standing at a temperature of 150°C. and a relative humidity of 10 % for 21 days.

3. Falling Strength, $f_{10}$:

With respect to one kind, 10 sample bottles were chosen, and a certain amount of saline water was filled into each bottle and sealed with a cap. Then, the bottles were allowed to stand still for 2 whole days in an atmosphere maintained at $-2°C$. and they were let to fall on concrete from a height of 120 cm at 20°C. so that the bottom face of the bottle hit on the concrete face. This falling test was repeated 10 times if the bottle was not broken. The number of the bottles which were not broken even when the falling test had been repeated 10 times was counted and the falling strength $f_{10}$ was calculated according to the following formula.

$$f_{10} = \frac{N - n_{10}}{N} \times 100 (\%)$$

in which $N$ is the number of the bottles tested (10) and $n_{10}$ is the number of bottles which were not broken even when the falling test was repeated 10 times.

4. Average Interlaminar Peel Strength, Sp:

A prescribed portion having a width of 2.0 cm was cut from a sample, and a part of the bonded interfacial area was peeled by a knife. Then, the sample piece was allowed to stand still for 7 days in an atmosphere maintained at a temperature of 25°C. and a relative humidity of 60 %.

Then, the remaining part of the bonded area was peeled at a pulling rate of 100 mm/min by means of a tensile tester and the bonding strength was read. The measurement was conducted under conditions of a temperature of 25°C. and relative humidity of 60 %. Each value is a mean value obtained from the results of the test made on 10 samples. In the case of a sample having a three-layer structure, the value is a mean value of the bonding strength between the outer and intermediate layer and the bonding strength between the intermediate and inner layers. The term "not peeled" given in Examples is used to indicate that at the preliminary peeling of a sample with a knife it was impossible to peel the bonded area or material fructure was caused to occur in either of layers of the sample during the tensile test.

EXAMPLE 1

100 parts by weight of a low density polyethylene having a density of 0.920 g/cc as measured according to ASTM D-1505 and a melt index of 2.0 g/10 min as measured according to ASTM D-1238 was incorporated with 5.5, 10.0, 30.0, 50.0 or 70.0 parts by weight of Surlyn A of the Na$^-$ type having a carbonyl concentration of 160 milliequivalents per 100 g of the polymer and a melt index of 1.2 g/10 min (ionomer manufactured by Du Pont, U.S.A. ), and the mixture was dry blended at room temperature for 3 minutes by means of a Henschel mixer. The so obtained dry blend was kneaded under heat and pelletized by means of a dulmage screw having a diameter of 40 mm and an effective length of 1120 mm and comprising a mixing zone of 8 threads at the top end portion ( screw rotation rate = 47 rpm; die temperature = 190°C. ).

Each of the so obtained pelletized blends and the above low density polyethylene as a comparative resin, and an ethylene-vinyl acetate copolymer saponified product having an ethylene content of 25.4 mole %, a degree of saponification of 99.2 % and an intrinsic viscosity of 0.08 l/g, were co-extruded with use of an inner- and outer-layer extruder installed with a dulmage screw having a deameter of 65 mm and an effective length of 1430 mm and comprising a mixing zone of four threads and provided with an adaptor having a twobranched melt channel, an intermediate layer extruder having a metering screw of a diameter of 40 mm and an effective length of 800 mm, and a three-ply die maintained at 180°C., in such a manner that the pelletized blend or low density polyethylene was extruded by the inner- and outer-layer extruder and the saponified copolymer was extruded by the intermediate layer extruder. Then, according to a known blow molding method the co-extrudate was molded into an oval bottle of a symmetric structure having outer and inner layers of the above low density polyethylene blend or the low density polyethylene alone and an intermediate layer of the above saponified copolymer. In each bottle, the outer layer : intermediate layer : inner layer thickness ratio was 4.5 : 1 : 4.5, the average thickness was about 600$\mu$ and the inner volume was about 280 cc. With respect to each of the so obtained bottles, the oxygen gas permeability QO$_2$, the water loss Lw and the average interlaminar peel strength Sp were determined according to the methods described in the text of the specification. The mixing weight ratio of the low density polyethylene (LDPE) and Surlyn A (C) in the blend layer (inner and outer layers ) and the results of determination of QO$_2$, Lw and Sp are shown in Table 1. From these results, it is seen that the average interlaminar strength was improved when the LDPE/C ratio was within a range of from 100/5.5 to 100/50.0 without substantial degradation of the oxygen gas permeation resistance and the water permeation resistance.

Table 1

| Composition of Blend Layer LDPE/C | QO$_2$ (cc/m$^2$·day·atm) | Lw (wt %) | Sp (g/2 cm) |
|---|---|---|---|
| 100/0 | 2 | 0.7 | 0 |
| 100/5.5 | 2 | 0.7 | 70 |
| 100/10.0 | 2 | 0.7 | 120 |
| 100/30.0 | 3 | 0.8 | 240 |
| 100/50.0 | 2 | 1.0 | 340 |
| 100/70.0 | 2 | 1.6 | 490 |

EXAMPLE 2

100 parts by weight of an ethylene-vinyl acetate copolymer saponified product having an ethylene content 25.4 mole %, a degree of saponification of 99.2 % and an intrinsic viscosity of 0.10 l/g was incorporated with 5.5, 10.0, 30.0, 50.0 or 70.0 parts by weight of Surlyn A of the Na$^+$ type having a carbonyl concentration of 160 milliequivalents per 100 g of the polymer and a melt index of 1.2 g/10 min (ionomer manufactured by Du Pont ), and the mixture was dry blended at room temperature for 3 minutes by means of a Henschel mixer. The dry blend was kneaded under heat and pelletized by a pelletizer having a dulmage screw of a diameter of 40 mm and an effective length of 1120 mm including a mixing zone of 8 threads at the top end portion ( screw rotation rate = 49 rpm; die temperature = 200°C. ). Each of the so obtained pelletized blends and the above ethylene-vinyl copolymer saponified product alone as a comparative resin, and a low density polyethylene having a density of 0.920 g/cc as measured according to ASTM D-1505 and a melt index of 0.3 g/10 min, were co-extruded with use of an intermediate layer extruder having a dulmage screw of a diameter of 40 mm and an effective length of 800 mm including a mixing zone of 5 threads, an inner- and outer-layer extruder installed with a metering screw of a diameter of 65 mm and an effective length of 1430 mm and provided with an adaptor having a branched melt channel, and a three-ply die maintained at 190°C., in such a manner that the above pelletized blend or the ethylene-vinyl acetate copolymer saponified product was extruded by the intermediate layer extruder and the low density polyethylene was extruded by the outer- and inner-layer extruder. According to a known blow molding method, the co-extrudate was molded into an oval bottle of a symmetric three-layer laminate structure having outer and inner layers of the low density polyethylene and an intermediate layer of the saponified copolymer blend or the saponified copolymer alone. In each of the so obtained bottles, the outer layer : intermediate layer : inner layer thickness ratio was 4.5 : 1 : 4.5, the average thickness was about 600 $\mu$ and the inner volume was about 280 cc. With respect to each bottle, the oxygen gas permeability QO$_2$, the water loss Lw and the average interlaminar peel strength Sp were determined according to the methods described in the text of the specification. In Table 2, the mixing weight ratio of the saponified copolymer (EV) and Surlyn A (C) in the blend layer ( intermediate layer ) and results of determination of QO$_2$, Lw and Sp are shown. From these results, it is seen that the average interlaminar strength was improved without substantial degradation of the oxygen permeation resistance and the water permeation resistance when the EV/C mixing weight ratio was within a range of from 100/5.5 to 100/50.0

Table 2

| Composition of Blend Layer EV/C | QO₂ (cc/m²·day·atm) | Lw (wt %) | Sp (g/2 cm) |
|---|---|---|---|
| 100/0 | 2 | 0.7 | 0 |
| 100/5.5 | 2 | 0.7 | 180 |
| 100/10.0 | 5 | 0.7 | 440 |
| 100/30.0 | 9 | 0.7 | 760 |
| 100/50.0 | 17 | 0.7 | not peeled |
| 100/70.0 | 48 | 0.7 | not peeled |

A bottle having outer and inner layers of the above low density polyethylene and an intermediate layer of an 80 : 20 ( weight ratio ) mixture of the above low density polyethylene and the above ethylene-vinyl acetate copolymer saponified product was prepared under the same extrusion and molding conditions with use of the same extruding machine as described above. The configuration, thickness ratio, average thickness and inner volume of this bottle were the same as those of the bottles prepared above. This bottle is designated as "bottle A".

Among the bottles prepared in this Examples, the bottle containing the above saponified copolymer and Surlyn A at a weight ratio of 100/30.0 ( designated as "bottle B") was chosen, and it was compared with the bottle A with respect to the appearance according to the visual observation method ( panel of 7 men ). Two men replied that the bottle A had a better appearance, and 5 men replied that the bottle B had a better appearance.

EXAMPLE 3

A blend of the same low density polyethylene and Surlyn A (ionomer manufactured by Du Pont, U.S.A.) as employed in Example 1 (the mixing ratio being the same as adopted in Example 1 ) and the same ethylene-vinyl acetate copolymer saponified product as used in Example 1 were co-extruded by employing the same inner- and outer-layer extruder and intermediate layer extruder as employed in Example 1 and a three-ply die ( T die ) maintained at 190°C. to obtain a sheet of a symmetric three-layer laminate structure having outer and inner layers of the blend of the above low density polyethylene and Surlyn A and an intermediate layer of the above ethylene-vinyl acetate copolymer saponified product. The average thickness of the resulting sheet was about 240 μ, and the outer layer : intermediate layer : outer layer thickness ratio was about 10 : 1 : 10. With respect to each of the so obtained sheets, the oxygen gas permeability QO₂ and the average interlaminar peel strength were determined according to the methods described in the text of the specification. The mixing weight ratio of the above low density polyethylene (LDPE) and Surlyn A (C) in the blend layer (outer and inner layers) and results of determination of QO₂ and Sp are shown in Table 3.

Table 3

| Composition of Blend Layer LDPE/C | QO₂ (cc/m²·day·atm) | Sp (g/2 cm) |
|---|---|---|
| 100/0 | 11 | 0 |
| 100/5.5 | 10 | 60 |
| 100/10.0 | 11 | 120 |
| 100/30.0 | 11 11 | 250 |
| 100/50.0 | 11 | 350 |
| 100/70.0 | 11 | 510 |

EXAMPLE 4

A blend of the same ethylene-vinyl acetate copolymer saponified product and Surlyn A ( ionomer manufactured by Du Pont, U.S.A. ) as employed in Example 2 ( the mixing weight ratio being the same as adopted in Example 2 ) and the same low density polyethylene ad used in Example 2 were co-extruded by employing the same intermediate layer extruder and inner- and outer-layer extruder as employed in Example 2 and a three-ply die ( T die ) maintained at 200°C. to obtaine a sheet of a symmetric three-layer laminate structure having outer and inner layers of the above low density polyethylene and an intermediate layer of the saponified copolymer blend. The average thickness of the sheet was about 240 μ and the outer layer : intermediate layer : inner layer thickness ratio was about 10 : 1 : 10. With respect to each of the so obtained sheets, the oxygen gas permeability QO₂ and the average interlaminar peel strength Sp were determined according to the methods described in the text of the specification. The weight ratio of the ethylene-vinyl acetate copolymer saponified product (EV) and Surlyn A (C) and results of determination of QO₂ and Sp are shown in Table 4.

Table 4

| Composition of Blend Layer EV/C | QO₂ (cc/m²·day·atm) | Sp (g/2 cm) |
|---|---|---|
| 100/0 | 11 | 0 |
| 100/5.5 | 12 | 190 |
| 100/10.0 | 25 | 460 |
| 100/30.0 | 47 | 790 |
| 100/50.0 | 91 | not peeled |
| 100/70.0 | 252 | not peeled |

EXAMPLE 5

100 parts by weight of a low density polyethylene having a density of 0.920 g/cc as measured according to ASTM D-1505 and a melt index of 2.0 g/10 min as measured according to ASTM D-1238 was incorporated with 10.0 parts by weight of an ethylene-ethyl acrylate copolymer having a carbonyl concentration of 450 milliequivalents per 100 g of the polymer and a melt index of 6.1 g/10 min, and the mixture was dry blended at toom temperature for 3 minutes by means of a Henschel mixer.

100 parts by weight of an ethylene-vinyl acetate copolymer saponified product having an ethylene content of 25.4 mole %, a degree of saponification of 99.2 % and an intrinsic viscosity of 0.10 l/g was incorporated with 10.0 parts by weight of the same ethylene-ethyl acrylate copolymer as above, and the mixture was dry blended under the same conditions as above.

The so obtained low density polyethylene blend or the above low density polyethylene alone as a comparative resin and the above saponified copolymer blend or the above saponified copolymer alone as a comparative resin were co-extruded with use of an intermediate layer extruder having a dulmage screw of a diameter of 40 mm and an effective length of 800 mm including a mixing zone of 5 threads, an inner- and outer-layer extruder installed with a metering screw of a diameter of 65 mm and an effective length of 1430 mm and provided with an adaptor having a branched melt channel, and a three-ply die maintained at 190°C., in such a manner that the above low density polyethylene blend or the above low density polyethylene alone was extruded by the intermediate layer extruder and the above saponified copolymer blend or the above saponified copolymer alone was extruded by the outer- and inner-layer extruder. According to a known blow molding methods, the co-extrudate was molded into an oval bottle of a symmetric three-layer laminate structure having outer and inner layers of the saponified copolymer blend or the saponified copolymer alone and an intermediate layer of the low density polyethylene blend or the low density polyethylene alone. In each of the so obtained bottles, the outer layer : intermediate layer : inner layer thickness ratio was 1 : 1 : 1, the average thickness was about 600 $\mu$ and the inner volume was about 280 cc. With respect to each bottle, the oxygen gas permeability $QO_2$, the water loss $Lw$, the falling strength $f_{10}$, and the average interlaminar peel strength $Sp$ were determined according to the methods described in the text of the specification. In Table 5, the mixing weight ratios of the low density polyethylene (LDPE) and the ethylene-ethyl acrylate copolymer (C) and of the saponified copolymer (EV) and the ethylene-ethyl acrylate copolymer (C) in the blend layers and results of determination of $QO_2$, $Lw$, $f_{10}$ and $Sp$ are shown. From these results, it is seen that the average interlaminar strength was improved without substantial degradation of the oxygen permeation resistance and the water permeation resistance by addition of the ethylene-ethyl acrylate copolymer.

Table 5

| Compositions of Blend Layers; LDPE/C and EV/C | $QO_2$ (cc/m²·day·atm) | Lw (wt %) | $f_{10}$ (%) | Sp (g/2 cm) |
|---|---|---|---|---|
| 100/0 | < 1 | 1.2 | 10 | 0 |
| 100/10 | < 1 | 1.4 | 0 | 660 |

EXAMPLE 6

100 parts by weight of an ethylene-vinyl acetate copolymer having a density of 0.93 g/cc as measured according to ASTM D-1505, a melt index of 1.2 g/10 cm as measured according to ASTM D-1238 and a vinyl acetate content of 5 mole % was incorporated with 15.0 parts by weight of Surlyn A of the Na⁺ type having a carbonyl concentration of 160 milliequivalents per 100 g of the polymer and a melt index of 1.2 g/10 min ( ionomer manufactured by Du Pont ), and the mixture was dry blended at room temperature for 3 minutes by means of a Henschel mixer.

100 parts by weight of an ethylene-vinyl acetate copolymer saponified product having an ethylene content of 49.4 mole %, a degree of saponification of 96.3 % and an intrinsic viscosity of 0.17 l/g was incorporated with 15.0 parts by weight of the above Surlyn A, and the mixture was dry blended under the same conditions as above.

The above ethylene-vinyl acetate copolymer blend or the ethylene-vinyl copolymer alone and the above saponified copolymer blend or the saponified copolymer alone was co-extruded with use of an intermediate layer extruder having a dulmage screw of a diameter of 40 mm and an effective length of 800 mm including a mixing zone of 5 threads, an inner- and outer-layer extruder installed with a dulmage screw of a diameter of 65 mm and an effective length of 1430 mm including a mixing zone of 5 threads at the end point portion and provided with an adaptor having a branched melt channel, and a three-ply die maintained at 175°C., in such a manner that the above saponified copolymer blend or the saponified copolymer alone was extruded by the intermediate layer extruder and the above copolymer blend or the copolymer alone was ectruded by the outer- and inner-layer extruder. According to a known blow molding method, the co-extrudate was molded into an oval bottle of a symmetric three-layer laminate structure having outer and inner layers of the above ethylene-vinyl acetate copolymer or said copolymer alone and intermediate layer of the saponified copolymer blend or the saponified copolymer alone. In each of the so obtained bottles, the outer layer : intermediate layer : inner layer thickness ratio was 10 : 1 : 10, the average thickness was about 600 $\mu$ and the inner volume was about 280 cc. With respect to each bottle, the oxygen gas permeability $QO_2$, the water loss $Lw$ and the average interlaminar peel strength $Sp$ were determined according to the methods described in the text of the specification. In Table 6, the mixing weight ratios of the copolymer (EVAC) and Surlyn A (C) and of the saponified copolymer (EV) and SurlynA (C) in the blend layers and results of determination of $QO_2$, $Lw$ and $Sp$ are shown. From these results, it is seen that the average interlaminar strength was improved without substantial degradation of the oxygen permeation resistance and the water permeation resistance by addition of Surlyn A.

Table 6

| Compositions of Blend Layers; EVAc/C and EV/C | $QO_2$ (cc/m²·day·atm) | Lw (wt %) | Sp (g/2 cm) |
|---|---|---|---|
| 100/0 | 39 | 1.2 | 220 |
| 100/15 | 42 | 1.3 | not peeled |

EXAMPLE 7

A high density polyethylene having a density of 0.950 g/cc as measured according to ASTM D-1505 and a melt index of 0.2 g/10 min as measured according to ASTM D-1238 and a low density polyethylene having a density of 0.920 g/cc and a melt index of 0.5 g/10 min were dry blended at a mixing weight ratio of 50/50, and the dry blend was kneaded under heat and pelletized by means of a pelletizer having a dulmage screw of a diameter of 40 mm and an effective length of 1120 mm including a mixing zone of 8 threads at the end point portion ( screw rotation rate = 50 rpm; die temperature = 200°C. ), to obtain a medium density having a density of 0.935 g/cc and a melt index of 0.3 g/10 min. 100 parts by weight of the so obtained medium density polyethylene was incorporated with 20.0 parts by weight of Surlyn A of the Na⁺ type having a carbonyl concentration of 160 milliequivalents per 100 g of the polymer and a melt index of 1.2 g/10 min ( ionomer manufactured by Du Pont ), and the mixture was dry blended at room temperature for 3 minutes by means of a Henschel mixer.

The so obtained dry blend or the above medium density polyethylene alone and an ethylene-vinyl acetate copolymer saponified product having an ethylene content of 25.4 mole %, a degree of saponification of 99.2 % and an intrinsic viscosity of 0.10 l/g were co-extruded with use of an intermediate layer extruder having a dulmage screw of a diameter of 40 mm and an effective length of 800 mm including a mixing zone of 5 threads, an inner- and outer-layer extruder installed with a metering screw of a diameter of 65 mm and an effective length of 1430 mm and provided with an adaptor having a branched melt channel, and a three-ply die maintained at 200°C., in such a manner that the above medium density polyethylene blend or the medium density polyethylene alone was extruded by the intermediate layer extruder and the above saponified copolymer was extruded by the outer- and inner-layer extruder. According to a known blow molding method, the co-extrudate was molded into an oval bottle of a symmetric three-layer laminate structure having outer and inner layers of the saponified copolymer and an intermediate layer of the medium density polyethylene blend or the medium density polyethylene alone. In the so obtained bottle, the outer layer : intermediate layer : inner layer thickness ratio was 1 : 10 : 1, the average thickness was about 600 and the inner volume was about 280 cc. With respect to each bottle, the oxygen gas permeability $QO_2$, the water loss $Lw$ and the average interlaminar peel strength $Sp$ were determined according to the methods described in the text of the specification. In Table 7, the mixing weight ratio of the medium density polyethylene (MDPE) and Surlyn A (C) in the blend layer (intermediate layer) and results of determination of $QO_2$, $Lw$ and $Sp$ are shown. From these results, it is seen that the average interlaminar strength was improved without substantial degradation of the oxygen permeation resistance and the water permeation resistance by addition of the above Surlyn A.

Table 7

| Composition of Blend Layer MDPE/C | $QO_2$ (cc/m²·day·atm) | $Lw$ (wt %) | $Sp$ (g/2 cm) |
|---|---|---|---|
| 100/0 | <1 | 0.6 | 0 |
| 100/20 | <1 | 0.8 | 190 |

EXAMPLE 8

100 parts by weight of an ethylene-vinyl acetate copolymer saponified product having an ethylene content 25.4 mole %, a degree of saponification of 99.2 % and an intrinsic viscosity of 0.08 l/g was incorporated with 40.0 parts by weight of Surlyn A of the $Na^+$ type having a carbonyl concentration of 160 milliequivalents per 100 g of the polymer and a melt index of 1.2 g/10 min (ionomer manufactured by Du Pont), and the mixture was dry blended at room temperature for 3 minutes by means of a Henschel mixer.

The so obtained dry blend or the above saponified copolymer as a comparative resin, and a high density polyethylene having a density of 0.950 g/cc as measured according to ASTM D-1505 and a melt index of 0.2 g/10 min, were co-extruded with use of an intermediate layer extruder having a dulmage screw of a diameter of 40 mm and an effective length of 800 mm including a mixing zone of 5 threads, an inner- and outer-layer extruder installed with a metering screw of a diameter of 65 mm and an effective length of 1430 mm and provided with an adaptor having a branched melt channel, and a three-ply die maintained at 225°C., in such a manner that the above saponified copolymer blend or the ethylene-vinyl acetate copolymer saponified product alone was extruded by the outer- and inner-layer extruder and the high density polyethylene was extruded by the intermediate layer extruder. According to a known blow molding method, the co-extrudate was molded into an oval bottle of a symmetric three-layer laminate structure having an intermediate layer of the high density polyethylene and outer and inner layers of the saponified copolymer blend or the saponified copolymer alone. In the so obtained bottle, the outer layer : intermediate layer : inner layer thickness ratio was 1 : 5 : 1, the average thickness was about 600 μ and the inner volume was about 280 cc. With respect to the so obtained bottle, the oxygen gas permeability $QO_2$ and the average interlaminar peel strength $Sp$ were determined according to the methods described in the text of the specification. In Table 8, the mixing weight ratio of the saponified copolymer (EV) and Surlyn A (C) in the blend layer (outer and inner layers) and results of determination of $QO_2$ and $Sp$ are shown.

Table 8

| Composition of Blend Layer EV/C | $QO_2$ (cc/m²·day·atm) | $Sp$ (g/2 cm) |
|---|---|---|
| 100/0 | 2 | 0 |
| 100/40 | 13 | 500 |

EXAMPLE 9

100 parts by weight of an ethylene-vinyl acetate copolymer having an ethylene content 25.4 mole %, a degree of saponification of 99.2 % and an intrinsic viscosity of 0.10 l/g was incorporated with 30.0 parts by weight of Surlyn A of the $Na^+$ type having a carbonyl concentration of 160 milliequivalents per 100 g of the polymer and a melt index of 1.2 g/10 min (ionomer manufactured by Du Pont), and the mixture was dry blended at room temperature for 3 minutes by means of a Henschel mixer.

The so obtained dry blend or the above ethylene-vinyl acetate copolymer saponified product alone as a comparative resin and a dry blend containing a low density polyethylene having a density of 0.920 g/cc as measured according to ASTM 1505 and a melt index of 0.3 g/10 min as measured according to ASTM D-1238 and the above ethylene-vinyl acetate copolymer saponified product at a weight ratio of 95 : 5, were co-extruded with use of an intermediate layer extruder having a dulmage screw of a diameter of 40 mm and an effective length of 800 mm including a mixing zone of 5 threads, an inner- and outer-layer extruder installed with a metering screw of a diameter of 65 mm and an effective length of 1430 mm and provided with an adaptor having a branched melt channel, and a three-ply die maintained at 200°C., in such a manner that the above saponified copolymer blend or the ethylene-vinyl acetate copolymer saponified product alone was extruded by the intermediate layer extruder and the low density polyethylene blend was extruded by the outer- and inner-layer extruder. According to a known blow molding method, the co-extrudate was molded into an oval bottle of a symmetric three-layer laminate structure having outer and inner layers of the low density polyethylene blend and an intermediate layer of the saponified copolymer blend or the saponified copolymer alone. In the so obtained bottle, the outer layer : intermediate layer : inner layer thickness ratio was 4.5 : 1 : 4.5, the average thickness was about 600 μ and the inner volume was about 280 cc. With respect to each bottle, the oxygen gas permeability $QO_2$, the water loss $Lw$, the falling strength $f_{10}$ and the average interlaminar peel strength Sp were determined according to the methods described in the text of the specification. In Table 9, the mixing weight ratio of the saponified copolymer (EV) and Surlyn A (C) in the intermediate layer and results of determination of $QO_2$, $Lw$, $f_{10}$ and $Sp$ are shown. From these results, it is seen that the average interlaminar strength was improved without substantial degradation of the oxygen permeation resistance, the falling strength and the water permeation resistance by addition of the above Surlyn A.

Table 9

| Composition of Blend Layer EV/C | $QO_2$ (cc/m²·day·atm) | Lw (wt %) | $f_{10}$ (%) | Sp (g/2 cm) |
|---|---|---|---|---|
| 100/0 | 1 | 0.8 | 0 | 250 |
| 100/30 | 2 | 0.9 | 0 | not peeled |

EXAMPLE 10

A high density polyethylene having a density of 0.950 g/cc as measured according to ASTM D-1505 and a melt index of 0.2 g/10 min and a low density polyethylene having a density of 0.920 g/cc and a melt index of 0.5 g/10 min were dry blended at a mixing weight ratio of 50/50, and the dry blend was kneaded under heat and pelletized by means of a pelletizer having a dulmage screw of a diameter of 40 mm and an effective length of 1120 mm including a mixing zone of 8 threads at the top end portion ( screw rotation rate of 50 rpm and die temperature of 200°C. ) to obtain a medium density polyethylene having a density of 0.935 g/cc and a melt index of 0.3 g/10 min.

100 parts by weight of the so obtained medium density polyethylene was incorporated with 20.0 parts by weight of Surlyn A of the Na⁺ type having a carbonyl concentration of 160 milliequivalents per 100 g of the polymer and a melt index of 1.2 g/10 min, and the mixture was dry blended at room temperature for 3 minutes by means of a Henschel mixer.

Separately, 100 parts by weight of an ethylene-vinyl acetate copolymer saponified product having an ethylene content of 25.4 mole %, a degree of saponification of 99.2 % and an intrinsic viscosity of 0.10 l/g was incorporated with 20.0 parts by weight of the same Surlyn A as above, and the mixture was dry blended as above.

The so obtained medium density polyethylene blend and the saponified copolymer blend was co-extruded with use of an inner layer extruder having a dulmage screw of a diameter of 40 mm and an effective length of 800 mm including a mixing zone of 5 threads, an outer layer extruder installed with a dulmage screw of a diameter of 65 mm and an effective length of 1430 mm including a mixing zone of 4 threads, and a two-ply die maintained at 210°C., in such a manner that the above ethylene-vinyl acetate copolymer saponified product blend was extruded by the inner layer extruder and the medium density polyethylene blend was extruded by the outer layer extruder. According to a known blow molding method, the coextrudate was molded into an oval bottle of an asymmetric twolayer laminate structure having an outer layer of the medium density polyethylene blend and an inner layer of the saponified copolymer blend. In the so obtained bottle, the outer layer : inner layer thickness ratio was about 20 : 1, the average thickness was about 600 μ and the inner volume was about 280 cc. With respect to this bottle, the oxygen gas permeability $QO_2$, the water loss $Lw$, the falling strength $f_{10}$ and the average interlaminar peel strength Sp were determined according to the methods described in the text of the specification. In Table 10, the mixing weight ratios of the saponified copolymer (EV) and Surlyn A (C) in the inner layer and of the medium density polyethylene (MDPE) and Surlyn A (C) in the outer layer, and results of determination of $QO_2$, $Lw$, $f_{10}$ and $Sp$ are shown.

Table 10

| Compositions of Blend Layers; MDPE/C and EV/C | $QO_2$ (cc/m²·day·atm) | Lw (wt %) | $f_{10}$ (%) | Sp (g/2 cm) |
|---|---|---|---|---|
| 100/0 | 3 | 0.5 | 0 | 0 |
| 100/20 | 3 | 0.6 | 0 | 830 |

EXAMPLE 11

100 parts by weight of a high density polyethylene having a density of 0.950 g/cc as measured according to ASTM D-1505 and a melt index of 0.2 g/10 min as measured according to ASTM D-1238 was incorporated with 30.0 parts by weight of an acrylic acid-grafted polyethylene having a carbonyl concentration of 250 milliequivalents per 100 g of the polymer and a melt index of 0.9 g/10 min, and the mixture was dry blended at room temperature for 3 minutes with use of a Henschel mixer.

Separately, 100 parts by weight of an ethylene-vinyl acetate copolymer saponified product having an ethylene content of 25.4 mole %, a degree of saponification of 99.2 % and an intrinsic viscosity of 0.16 l/g was incorporated with 30.0 parts by weight of the same acrylic acid-grafted polyethylene as above, and the mixture was dry blended under the same conditions as above.

The so obtained high density polyethylene blend and saponified copolymer blend was co-extruded with use of an outer layer extruder having a dulmage screw of a diameter of 40 mm and an effective length of 800 mm including a mixing zone of 5 threads, an inner layer extruder installed with a dulmage screw of a diameter of 65 mm and an effective length of 1430 mm including a mixing zone of 4 threads, and a two-ply die maintained at 230°C., in such a manner that the above ethylene-vinyl acetate copolymer saponified product blend was extruded by the outer layer extruder and the high density polyethylene blend was extruded by the inner layer extruder. According to a known blow molding method, the co-extrudate was molded into an oval bottle of an asymmetric two-layer laminate structure having an inner layer of the low density polyethylene blend and an outer layer of the saponified copolymer blend. In the so obtained bottle, the outer layer : inner layer thickness ratio was about 1 : 20, the average thickness was about 600 μ and the inner volume was about 280 cc. With respect to this bottle, the oxygen gas permeability $QO_2$, the water loss $Lw$, the falling strength $f_{10}$ and the average interlaminar peel strength Sp were determined according to the methods described in the text of the specification. In Table 11, the mixing weight ratios of the saponified copolymer (EV) and the acrylic acid-grafted polyethylene (C) in the outer layer and of the high density polyethylene (HDPE) and the acrylic acid-grafted polyethylene (C) and results of determination of $QO_2$, $Lw$ and $Sp$ are shown.

Table 11

| Composition of Blend Layers HDPE/C and EV/C | $QO_2$ [cc/m$^2$·day·atm] | Lw [wt %] | $F_{10}$ [%] | Sp [g/2 cm] |
| --- | --- | --- | --- | --- |
| 100/0 | 4 | 0.2 | 0 | 0 |
| 100/30 | 10 | 0.4 | 0 | 450 |

EXAMPLE 12

100 parts by weight of a low density polyethylene having a density of 0.928 g/cc as measured according to ASTM D-1505 and a melt index of 3.0 g/10 min as measured according to ASTM D-1238 was incorporated with Surlyn A of the Zn type having a carbonyl concentration of 150 milliequivalents per 100 g of the polymer and a melt index of 0.7 g/10 min (ionomer manufactured by Du Pont, U.S.A.), and the mixture was dry blended at room temperature for 3 minutes by means of a Henshel mixer.

The so obtained dry blend and an ethylene-vinyl acetate copolymer saponified product having an ethylene content of 25.4 mole %, a degree of saponification of 99.2 % and an intrinsic viscosity of 0.16 l/g were co-extruded with use of an inner layer extruder having a metering screw of a diameter of 40 mm and an effective length of 800 mm, an outer layer extruder installed with a dulmage screw of a diameter of 65 mm and an effective length of 1430 mm including a mixing zone of 4 threads, and a two-ply inflation die maintained at 190°C., in such a manner that the above or the ethylene-vinyl acetate copolymer saponified product was extruded by the inner layer extruder and the low density polyethylene blend was extruded by the outer layer extruder. According to a known inflation molding method, the co-extrudate was molded into a film of an asymmetric two-layer laminate structure having an inner layer of the saponified copolymer and an outer layer of the above low density polyethylene blend. In the so obtained film, the outer layer : inner layer thickness ratio was about 1 : 1 and the average thickness was about 100 $\mu$.

For comparison, the co-extrusion and inflation molding were conducted under the same conditions with use of the same extruding and molding machines as above except that the above low density polyethylene alone was used as the outer layer-consituting resin material instead of the above low density polyethylene blend, to thereby obtain a comparative film being identical with the above laminate film comprising the low density polyethylene blend layer with respect to the average thickness and the thickness ratio.

With respect to each of the so obtained films, the oxygen gas permeability $QO_2$ was determined according to the pressure method described in the text of the specification to obtain results shown in Table 12. Results obtained when the determination was conducted while adjusting the outside humidity (humidity on the high pressure side) to 75 % relative humidity are also shown in Table 12.

Table 12

| Composition of Blend Layer LDPE/C | Outside Humidity | $Q_{O_2}$ [cc/m$^2$·day·atm] |
| --- | --- | --- |
| 100/0 | 15 % RH | 2 |
|  | 75 % RH | 2 |
|  | 15 % RH | 2 |

Table 12-continued

| Composition of Blend Layer LDPE/C | Outside Humidity | $Q_{O_2}$ [cc/m$^2$·day·atm] |
| --- | --- | --- |
| 100/10 | 75 % RH | 3 |

Each of these two laminate films was molded into a bag of a length of 170 mm and a width of 115 mm by means of a heat sealer. Each bag was filled with about 200 cc of water or edible oil and an opening was heat sealed. The bag was then allowed to stand at a temperature of 50°C. and a relative humidity of 10 % for 21 days, and the appearance (delamination state) was examined to obtain results shown in Table 13.

Table 13

| Composition of Blend Layer LDPE/C | Appearance Change after 21 Days | |
| --- | --- | --- |
|  | Content of Bag | Delamination State |
| 100/0 | water | delamination was observed |
|  | edible oil | delamination was not observed |
| 100/10 | water | delamination was not observed |
|  | edible oil | delamination was not observed |

EXAMPLE 13

100 parts by weight of a low density polyethylene having a density of 0.928 g/cc as measured according to ASTM D-1505 and a melt index of 3.0 g/10 min as measured according to ASTM D-1238 was incorporated with 10.0 parts by weight of Surlyn A of the Zn type having a carbonyl concentration of 150 milliequivalents per 100 g of the polymer and a melt index of 0.7 g/10 cc, and the mixture was dry blended at room temperature for 3 minutes by a Henschel mixer. The so obtained low density polyethylene blend and an ethylene-vinyl acetate copolymer saponified product having an ethylene content of 25.4 mole %, a degree of specification of 99.2 % and an intrinsic viscosity of 0.16 l/g were co-extruded with use of an under layer extruder having a dulmage screw of a diameter of 40 mm and an effective length of 800 mm including a mixing zone of 5 threads, an outer layer extruder installed with a metering screw of a diameter of 65 mm and an effective length of 1430 mm and a two-ply inflation die maintained at 190°C., in such a manner that the above ethylene-vinyl acetate copolymer saponified product was extruded by the outer layer extruder and the low density polyethylene blend was extruded by the inner layer extruder. According to a known inflation molding method, the co-extrudate was molded into a film of an asymmetric two-layer structure having an inner layer of the low density polyethylene blend and an outer layer of the saponified copolymer. In the so obtained film, the outer layer : inner layer thickness ratio was about 1 : 1 and the average thickness was about 100 $\mu$.

For comparison, the co-extrusion and inflation molding were conducted under the same conditions with use of the same extruding and molding machines as above except that the above low density polyethylene alone was used as the inner layer-constituting material instead of the above low density polyethylene blend, to thereby obtain a film which was identical with the above film including the low density polyethylene blend inner layer, with respect to the average thickness and the thickness ratio.

With respect to each of these two laminate films, the oxygen gas permeability $QO_2$ was determined according to the pressure method described in the text of the specification to obtain results shown in Table 14. Results obtained when the determination was conducted while adjusting the outside humidity (humidity on the high pressure side) to 75 % RH are also shown in Table 14.

Table 14

| Composition of Blend Layer LDPE/C | Outside Humidity | $Qo_2$ [cc/m²·day·atm] |
|---|---|---|
| 100/0 | 15 % RH | 2 |
| | 75 % RH | 9 |
| 100/10 | 15 % RH | 2 |
| | 75 % RH | 5 |

Each of the above two laminate films was molded into a bag of a length of 170 mm and a width of 115 mm by means of a heat sealer. The bag was filled with about 200 cc of water or edible oil and an opening of the bag was heat sealed. The bag was then allowed to stand still at a temperature of 50°C. and a relative humidity of 10 % for 21 days, and the appearance (delamination state) was examined to obtain results shown in Table 15.

Table 15

| Composition of Blend Layer LDPE/C | Appearance Change after 21 Days | |
|---|---|---|
| | Content of Bag | Delamination State |
| 100/0 | water | delamination was not observed |
| | edible oil | delamination was observed |
| 100/10 | water | delamination was not observed |
| | edible oil | delamination was not observed |

EXAMPLE 14

100 parts by weight of an ethylene-vinyl acetate copolymer saponified product having an ethylene content 25.4 mole %, a degree of saponification of 99.2 % and an intrinsic viscosity of 0.08 was incorporated with 30.0 parts by weight of Surlyn A of the $Na^+$ type having a carbonyl concentration of 160 milliequivalents per 100 g of the polymer and a melt index of 1.2 g/10 min (ionomer manufactured by Du Pont), and the mixture was dry blended at room temperature for 3 minutes by a Henschel mixer.

Separately, a 92 : 8 weight ratio blend of a high density polyethylene having a density of 0.948 g/cc as measured according to ASTM D-1505 and a melt index of 1.0 g/10 min as measured according to ASTM D-1238 and a polyisobutylene having an average molecular weight of 1,000,000 was kneaded under heat and pelletized by means of a pelletizer having a screw of a diameter of 40 mm and an effective length of 1120 mm including a mixing zone of 8 threads at the end point portion (screw rotation rate = 60 rpm; die temperature = 220°C.).

The above saponified copolymer blend and the polyethylene blend were co-extruded with use of an inner layer extruder having a dulmage screw of a diameter of 40 mm and an effective length of 800 mm including a mixing zone of 5 threads, an outer layer extruder installed with a dulmage screw of a diameter of 65 mm and an effective length of 1430 mm including a mixing zone of 4 threads, and a two-ply die maintained at 220°C., in such a manner that the above ethylene-vinyl acetate copolymer saponified product blend was extruded by the inner layer extruder and the polyethylene blend was extruded by the outer layer extruder. According to a known blow molding method, the co-extrudate was molded into an oval bottle of an asymmetric two-layer laminate structure having an outer layer of the polyethylene blend and an inner layer of the saponified copolymer blend. In the so obtained bottle, the outer layer : inner layer thickness ratio was about 9 : 1, the average thickness was about 600 $\mu$ and the inner volume was about 280 cc. With respect to this bottle, the oxygen gas permeability $QO_2$, the falling strength $f_{10}$ and the average interlaminar peel strength $Sp$ were determined according to the methods described in the text of the specification. In Table 16, the mixing weight ratio of the saponified copolymer (EV) and Surlyn A (C) in the inner layer and results of determination of $QO_2$, $f_{10}$ and $Sp$ are shown.

Table 16

| Composition of Blend Layer EV/C | $Qo_2$ [cc/m²·day·atm] | $F_{10}$ [%] | $Sp$ [g/2 cm] |
|---|---|---|---|
| 100/0 | 2 | 0 | 0 |
| 100/30 | 8 | 0 | 210 |

EXAMPLE 15

100 parts by weight of an ethylene-vinyl acetate copolymer saponified product having an ethylene content 25.4 mole %, a degree of saponifcation of 99.2 % and an intrinsic viscosity of 0.08 l/g was incorporated with 5.0 parts by weight of Surlyn A to the Zn type having a carbonyl concentration of 150 milliequivalents per 100 g of the polymer and a melt index of 0.7 g/10 min (ionomer manufactured by Du Pont), and the mixture was dry blended at room temperature for 3 minutes by means of a Henschel mixer.

The above saponified copolymer blend and a 95 : 5 weight ratio dry blend of a low density polyethylene having a density of 0.920 g/cc as measured according to ASTM D-1505 and a melt index of 0.3 g/10 min and the above ethylene-vinyl acetate copolymer saponified product were co-extruded with use of an inner layer extruder having a dulmage screw of a diameter of 40 mm and an effective length of 800 mm including a mixing zone of 5 threads, an outer layer extruder installed with a dulmage screw of a diameter of 65 mm and an effective length of 1430 mm including a mixing zone of 6 threads, and a two-ply die maintained at 190°C., in such a manner that the above ethylene-vinyl acetate copolymer saponified product blend was extruded by the inner layer extruder and the low density polyethylene blend was extruded by the outer layer extruder. According to a known blow molding method, the co-extrudate was molded into an oval bottle of an asymmetric twolayer laminate structure having an outer layer of the low density polyethylene blend and an inner layer of the saponified copolymer blend. In the so obtained bottle, the outer layer : inner layer thickness ratio was about 20 : 1, the average thickness was about 600 $\mu$ and the inner volume was about 280 cc. With respect to each bottle, the oxygen gas permeability $QO_2$ and the average interlaminar peel strength $Sp$ were determined according to the method described in the text of the specification. In Table 17, the mixing weight ratio of the saponified copolymer (EV) and Surlyn A (C) in the blend layer (inner layer) and results of determination of $QO_2$ and Sp are shown.

Table 17

| Composition of Blend Layer EV/C | $Qo_2$ [cc/m²·day·atm] | Sp [g/2 cm] |
|---|---|---|
| 100/0 | 4 | 230 |
| 100/5.0 | 4 | 390 |

EXAMPLE 16

Surlyn A of the $Na^+$ type having a density of 0.942 g/cc as measured according ASTM D-1505, a melt density of 0.80 g/cc as measured at 190°C., a melt index of 1.2 g/10 min and a carbonyl concentration of 160 milliequivalents per 100 g of the polymer was extruded with use of an intermediate layer extruder of a three-layer vessel extrusion molding machine, which comprised an intermediate layer extruder having a metering screw of a diameter of 40 mm and an effective length of 800 mm, and outer- and inner-layer extruder installed with a metering screw of a diameter of 65 mm and effective length of 1430 mm and provided with an adaptor having a two-branched melt channel, and a three-ply die having a sectional area of an intermediate layer passage of 0.44 cm² at the junction point of the three layers. The extrusion was conducted at a screw rotation rate of 15 rpm in the intermediate layer extruder and at a temperature of 190°C. at said three-ply die. The average flow rate of 1.1 cm/sec was calculated from the extrusion rate (1.4 Kg/hr) obtained in this test.

An ethylene-vinyl acetate copolymer saponified product having an ethylene content of 25.4 mole %, a degree of saponification of 99.2 %, an intrinsic viscosity of 0.08 l/g, a density of 1.19 g/cc as measured at 23°C. and a melt density of 1.07 g/cc was extruded under the same extrusion contditions as above with use of the intermediate layer extruder of the same extrusion molding machine as above. The average flow rate of 2.7 cm/sec in the die was calculated from the extrusion rate (4.6 Kg/hr) obtained in this test.

The above extrusion test was made on the above Surlyn A and saponified copolymer in the same manner as mentioned above except that the rotation rate of the screw of the intermediate layer extruder was changed to 7 rpm. In the case of the Surlyn A, the average flow rate of 0.51 cm/sec in the die was calculated from the extrusion rate of 0.65 Kg/hr, and in the case of the saponified copolymer the average flow rate of 1.26 cm/sec in the die was calculated from the extrusion rate of 2.15 Kg/hr.

A 50 : 50 weight ratio mixture of the above Surlyn A and the above ethylene-vinyl acetate copolymer saponified product was dry blended at room temperature for 3 minutes by means of a Henschel mixer.

The so obtained dry blend and a low density polyethylene having a density of 0.920 g/cc as measured according to ASTM D-1505 and a melt index of 0.3 g/10 min were co-extruded by employing the above extrusion molding machine while maintaining the above-mentioned three-ply die at 190°C., in such a manner that the above dry blend was extruded by the intermediate layer extruder and the low density polyethylene was extruded by the outer- and innerlayer extruder. At this extrusion operation, in the intermediate layer extruder the rotation rate of the screw was 15 rpm and the extrusion pressure was 6 Kg/cm². In the outer- and inner-layer extruder, the rotation rate was 20 rpm and the extrusion pressure was 10 Kg/cm².

The so obtained co-extrudate was molded into an oval bottle having a symmetric three-layer laminate structure having an intermediate layer of said saponified copolymer blend and outer and inner layers of said low density polyethylene, according to a known blow molding method. In each of the so obtained bottles, the thickness ratio of outer layer : intermediate layer : inner layer was 4.5 : 1 : 4.5 and the bottles had an average thickness of about 600 $\mu$ and an inner volume of about 280 cc. The so obtained bottle is designated as bottle A.

The co-extrusion was conducted under the same conditions with use of the same polymer materials and the same extruders and three-ply die as above, except that the rotation rate of the screw of the intermediate layer extruder was changed to 7 rpm (extrusion pressure being 2.5 Kg/cm²) and the rotation of the screw of the outer- and inner-layer extruder was changed to 9.5 rpm (extrusion pressure being 4.5 Kg/cm²). The co-extudate was molded according to a known blow molding method to obtain a bottle having the same average thickness, the same thickness ratio, the same inner volume and the layer structure as those of bottle A. The so obtained bottle is designated as bottle B.

The co-extrusion was conducted under the same conditions with use of the same polymer materials and extruders as in the case of the above bottle A except that in the intermediate layer extruder the metering screw was replaced by a dulmage type screw having a mixing zone of 8 threads at the top end portion (having a diameter of 40 mm and an effective length of 800 mm). The coextrudate was molded into a bottle identical with the bottle A with respect to the configuration, layer structure, thickness ratio, average thickness and inner volume. The so formed bottle is designated as "bottle C".

With respect to each of the so obtained bottles F, G and H, the oxygen gas permeability $QO_2$ and the average interlaminar peel strength were determined according to the methods described in the text of the specification to obtain results shown in Table 18.

As is seen from the results shown in Table 18, the value of $QO_2$ is smaller in the order of A, B and C, and hence, the oxygen barrier property is higher in this order. it is also known that the bottle A has a highest Sp value and the bottle C is a lowest Sp value.

Then, with respect to each of these three bottles, the blend layer (intermediate layer) was divided into three layers according to the method described in the text of the specification, and the value of log $(Io/I)/\bar{\mu}$, $m_1$ and $m_2$ of divided layers 1 and 3 adjacent to the low density polyethylene layer and the intermediate divided layer 2 were calculated according to the equations (A) and (B) given in the text of the specification. Results are shown in Table 19.

The value of $m_1$ obtained in the case of the bottle C approximates 1, and it is evident that the blend layer is composed of a substantially homogeneous mixture. In contrast, the value of $m_1$ of each divided layer adjacent to the polyethylene layer is significantly smaller than 1.00 and hence, it is seen that the Surlyn A is predominantly contained in portions adjacent to the outer and inner layers (low density polyethylene layers).

EXAMPLE 17

A 95 : 5 weight ratio dry blend of the same ethylene-vinyl acetate copolymer saponified product as employed in Example 16 and an ethylene-vinyl acetate copolymer having a density of 0.943 g/cc as measured according to ASTM D-1505, a melt index of 1.3 g/10 min as measured according to ASTM D-1238, a melt density of 0.80 g/cc as measured at 190°C., a vinyl acetate content of 17 % by weight, a carbonyl concentration of 450 milliequivalents per 100 g of the polymer and an average flow rate of 1.2 cm/sec as determined under the same conditions as described in Example 16, was prepared in the same manner as described in Example 16. The so obtained dry blend and the same low density polyethylene were co-extruded by employing the same intermediate layer extruder (installed with the metering screw), inner- and outer-layer extruder, three-ply die and extrusion conditions as employed in Example 16 for formation of the bottle A, and according to a known blow molding method the co-extrudate was molded into a bottle having a symmetric three-layer structure of an intermediate layer of the above blend and inner and outer layers of the above low density polyethylene, which was identical with the bottle A obtained in Example 16 with respect to the average thickness, thickness ratio, configuration and inner volume. This bottle is designated as "bottle D".

The co-extrusion was conducted under the same conditions as adopted for formation of the bottle B except that in the intermediate layer extruder the metering screw was replaced by the same dulmage screw as used in Example 16 for formation of the bottle C. The so obtained co-extrudate was molded in a bottom identical with the bottle D with respect to the layer structure, configuration, average thickness, thickness ratio and inner volume. This bottle is designated as "bottle E".

With respect to each of the so obtained bottles D and E, the oxygen gas permeability $QO_2$ and the average interlaminar peel strength Sp were determined according to the methods described hereinabove to obtain results shown in Table 18.

With respect to each of these two bottles, according to the method described in the text of the specification, the intermediate layer (blend layer) was divided into three layers, and the values of $\log(Io/I)/\bar{\mu}$ and $m_1$ of the divided layers 1 and 3 adjacent to the low density polyethylene layers were calculated from the equatios given in the text of the specification to obtain results shown in Table 19.

What we claim is:

Table 18

| Example No. | Sample | $QO_2$ (cc/m²·day·atm) | Sp (g/2 cm) |
|---|---|---|---|
| 16 | A | 19.1 | 260 |
| 16 | B | 37.0 | 120 |
| 16 | C | 89.6 | 100 |
| 17 | D | 3.9 | 10 |
| 17 | E | 5.9 | 6 |

Table 19

| Example No. | Sample | Identification of Layer | $\log(Io/I)/\bar{\mu}$ ×10³ | $m_1$ | $m_2$ |
|---|---|---|---|---|---|
| 16 | A | 1 | 38.3 | 0.90 | |
| 16 | A | 3 | 32.8 | 0.77 | |
| 16 | B | 1 | 40.8 | 0.96 | |
| 16 | B | 3 | 39.1 | 0.92 | |
| 16 | C | 1 | 42.1 | 0.99 | |
| 16 | C | 3 | 42.5 | 1.00 | |
| 17 | D | 1 | 76.8 | 0.95 | |
| 17 | D | 3 | 75.0 | 0.93 | |
| 17 | E | 1 | 81.6 | 1.01 | |
| 17 | E | 3 | 80.0 | 0.79 | |
| 16 | A | 2 | 56.5 | | 1.33 |
| 16 | C | 2 | 43.0 | | 1.01 |

1. A resin laminate structure having an improved gas permeation resistance and high resistance to delamination formed by means of co-extrusion of plurality of resin melts, which structure comprises a layer of a polyolefin and a layer of a blend consisting essentially of (A) a saponified product of an ethylene-vinyl acetate copolymer having an ethylene content of 25 to 50 mole % and a degree of saponification of at least 96% and (B) a thermoplastic polymer containing a carbonyl group in the main or side chain thereof, at an A : B mixing weight ratio ranging from 95 : 5 to 50 : 50, said two layers being laminated so that said two layers are adjacent to each other, wherein said blend layer has such a multi-layer laminar structure that the polymer composition is different with respect to the thickness direction but substantially identical with respect to the plane direction and that when the blend layer is divided into three layers in the direction of the thickness, the divided layer adjacent to said polyolefin layer contains predominantly said carbonyl group-containing thermoplastic polymer, namely contains said saponified product in an amount expressed by the following formula $$M_1 = m_1 X$$

wherein $X$ stands for the average content (% by weight) of the ethylene-vinyl acetate copolymer saponified product in the blend layer, $m_1$ is a number of from 0 to 0.95 and $M_1$ is the content (% by weight) of said saponified copolymer in said divided layer adjacent to the polyolefin layer, and at least one layer of the divided layers other than the divided layer adjacent to the polyolefin layer contains said ethylene-vinyl acetate copolymer predominantly, namely in an amount of expressed by the following formula $$M_2 = m_2 X$$

wherein $X$ is as defined above, $M_2$ is the content (% by weight) of said saponified copolymer in said specific divided layer, and $m_2$ is a number of from 1.2 to 4.

2. A resin laminate structure set forth in claim 1 wherein the polyolefin is selected from the group consisting of crystalline homopolymers and copolymers of olefins expressed by the following formula

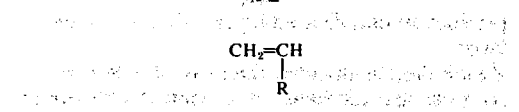

wherein R is a hydrogen atom or an alkyl group having up to 4 carbon atoms.

3. A resin laminate structure set forth in claim 1 wherein the polyolefin has a melt index of from 0.05 to 5.0 g/10 min.

4. A resin laminate structure set forth in claim 1 wherein the polyolefin is selectively a low density, polyethylene, a medium density polyethylene or a high density polyethylene.

5. A resin laminate structure set forth in claim 1 wherein the polyolefin is an isotactic polypropylene.

6. A resin laminate structure set forth in claim 1 wherein said saponified ethylene-vinyl acetate copolymer has an intrinsic viscosity [$\eta$], measured at 30°C. with use of a mixed solvent of 85 % by weight of phenol and 15 % by weight of water, of from 0.07 to 0.17 l/g.

7. A resin laminate structure set forth in claim 1 wherein said thermoplastic polymer contains carbonyl groups at a concentration of 120 to 1400 milliequivalents per 100 g of the polymer.

8. A resin laminate structure set forth in claim 1 wherein said carbonyl group-containing thermoplastic polymer is a homopolymer of a monomer expressed by the following formula

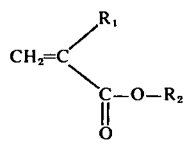

wherein $R_1$ is a hydrogen atom or a lower alkyl group having up to 4 carbon atoms, and $R_2$ is a hydrogen atom or an alkyl group having 1 to 12 carbon atoms,
or a copolymer of said monomer with an olefin or other $\alpha$, $\beta$-ethylenically unsaturated monomer.

9. A resin laminate structure set forth in claim 1 wherein said carbonyl group-containing thermoplastic polymer is a homopolymer of a monomer expressed by the following formula

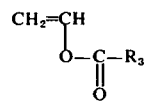

wherein $R_3$ is a hydrogen atom or an alkyl group having up to 4 carbon atoms or a phenyl group,
or a copolymer of said monomer with an olefin or a carbonyl group-free, other $\alpha$, $\beta$-ethylenically unsaturated monomer.

10. A resin laminate structure set forth in claim 1 wherein said carbonyl group-containing thermoplastic polymer is an ionomer.

11. A resin laminate structure set forth in claim 1 wherein said carbonyl group-containing thermoplastic polymer is a polyamide or copolyamide composed of recurring units expressed by the following formula

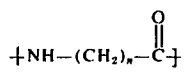

or

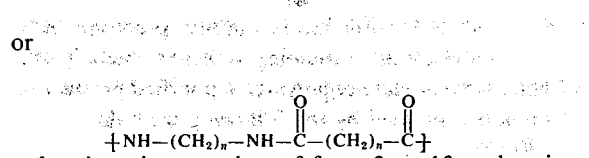

wherein n is a number of from 3 to 13 and m is a number of from 4 to 11.

12. A resin laminate structure set forth in claim 1 wherein said carbonyl group-containing thermoplastic polymer is incorporated in an amount of 5 to 50 parts by weight of said polyolefin or said ethylene-vinyl acetate copolymer saponified product.

13. A resin laminate structure set forth in claim 1 which is in the form of a thin thickness molded article having a two-dimensional face and a thickness of 70 $\mu$ to 6 mm.

14. A resin laminate structure set forth in claim 1 which comprises first and second surface layers composed of a blend of the polyolefin and the carbonyl group-containing thermoplastic polymer and formed by melt extrusion of said blend, and an intermediate layer composed of the ethylene-vinyl acetate copolymer saponified product and formed by melt extrusion of said saponified copolymer conducted simultaneously with the melt extrusion of said blend, wherein said intermediate layer is bonded to each of said surface layers without any interposing layer of an adhesive.

15. A resin laminate structure set forth in claim 1 which comprises first and second surface layers composed of the polyolefin and formed by melt extrusion of the polyolefin and an intermediate layer composed of a blend of the ethylene-vinyl acetate copolymer saponified product and the carbonyl group-containing thermoplastic polymer and formed by melt extrusion of said blend conducted simultaneously with the melt extrusion of the polyolefin, wherein said intermediate layer is bonded to each of said surface layers without any interposing layer of an adhesive.

16. A resin laminate structure set forth in claim 1, which is formed by co-extruding a melt of the polyolefin and a melt of the blend through a die under such conditions that the difference of the flow rate between the melt of the ethylene-vinyl acetate copolymer saponified product and the melt of the carbonyl group-containing thermoplastic polymer at the die passage for said blend is at least 1 cm/sec, and joining the extruded resin flows.

17. A molded structure having an improved gas permeation resistance and high resistance to delamination formed by means of co-extrusion molding from a polyolefin melt and a molten mixture consisting essentially of (A) a saponified product of an ethylene-vinyl acetate copolymer having an ethylene content of 25 to 50 mole % and a degree of saponification of at least 96% and (B) a thermoplastic polymer containing a carbonyl group in the main or side chain thereof in an amount of from 120 to 1400 milliequivalents per 100 g of the said thermoplastic polymer, at a weight ratio of A : B ranging from 95 : 5 to 50, said molded structure comprising first and second layers composed of the polyolefin and an intermediate layer of the blend of said saponified product and said carbonyl group-containing polymer, said blend layer having a layer structure in which the polymer composition is different in the thickness direction but substantially identical in the plane direction, wherein when said blend layer is divided in three layers in the thickness direction, the two divided layers adjacent to said polyolefin layers contain predominantly said carbonyl group-containing polymer, namely the ethylene-vinyl acetate copolymer saponified product in an amount expressed by the following formula $$M_1 = m_1 X$$

wherein X is the average content (% by weight) of the ethylene-vinyl acetate copolymer saponified product in said molded structure, $m_1$ is a number of from 0 to 0.95, and $M_1$ is the content (% by weight) of the ethylene-vinyl acetate copolymer saponified product in said divided layers adjacent to the olefin layer, and a divided layer other than said divided two layers contains the ethylene-vinyl acetate copolymer saponified product in an amount expressed by the following formula $$M_2 = m_2 X$$

wherein $X$ is as defined above, $m_2$ is a number of from 1.2 to 4, and $M_2$ is the content (% by weight) of the ethylene-vinyl acetate copolymer saponified product in said layer.

* * * * *